(12) United States Patent  (10) Patent No.: US 8,806,533 B1
Lau et al.  (45) Date of Patent: Aug. 12, 2014

(54) SYSTEM AND METHOD FOR USING TELEVISION INFORMATION CODES

(75) Inventors: Erwin Lau, Hong Kong SAR (CN); Danny Gaydou, II, Chesapeake, VA (US); Robert Mechler, Pine Grove, CO (US)

(73) Assignee: United Video Properties, Inc., Santa Clara, CA (US)

( * ) Notice: Subject to any disclaimer, the term of this patent is extended or adjusted under 35 U.S.C. 154(b) by 1270 days.

(21) Appl. No.: 11/246,778

(22) Filed: Oct. 7, 2005

Related U.S. Application Data

(60) Provisional application No. 60/617,025, filed on Oct. 8, 2004.

(51) Int. Cl.
    *G06F 3/00* (2006.01)
(52) U.S. Cl.
    USPC .............. 725/45; 725/40; 725/52; 725/57; 725/61; 715/719
(58) Field of Classification Search
    CPC ............. H04N 21/482–21/4828; G11B 27/34
    USPC ...................................... 725/39–61
    See application file for complete search history.

(56) References Cited

U.S. PATENT DOCUMENTS

| | | | |
|---|---|---|---|
| 3,848,193 A | 11/1974 | Martin et al. |
| 3,893,049 A | 7/1975 | Bray |
| 3,956,745 A | 5/1976 | Ellis |
| 4,024,401 A | 5/1977 | Bernstein et al. |
| 4,079,419 A | 3/1978 | Siegle et al. |
| 4,081,753 A | 3/1978 | Miller |
| 4,081,754 A | 3/1978 | Jackson |
| 4,103,524 A | 8/1978 | Mitchell et al. |
| 4,162,513 A | 7/1979 | Beyers et al. |
| 4,170,782 A | 10/1979 | Miller |
| 4,193,120 A | 3/1980 | Yello |
| 4,206,483 A | 6/1980 | Nakamura |

(Continued)

FOREIGN PATENT DOCUMENTS

| AR | 032904 | 5/2008 |
|---|---|---|
| AR | 066559 | 8/2009 |

(Continued)

OTHER PUBLICATIONS

Ntz, vol. 35, (1982, Heft 6, pp. 368-376; H. Eckhard Kruger: 'Das digitale Fernsehkennungssystem ZPS.

(Continued)

*Primary Examiner* — Farzana Hossain
(74) *Attorney, Agent, or Firm* — Ropes & Gray LLP

(57) ABSTRACT

A system and method for using information codes for recording television programs. Information codes may be published in magazines, newspapers, and the like, much like VCR Plus+™ codes. When a user desires to record one or more television programs based on information codes, the user selects an appropriate command button on his or her input device, and enters the information code that identifies a desired filter category (e.g. an actor filter represented as "01") followed by a desired filter identifier (e.g. Richard Gere represented as "1234"). A processor receiving the user input searches an electronic program guide database for programs matching the filter information. The identified programs are then stored in a record memory for recording at an appropriate time. The identified programs may be further displayed for verification prior to storage in the record memory. Programs recommended to the viewers may also be identified via information codes.

22 Claims, 5 Drawing Sheets

(56) References Cited

U.S. PATENT DOCUMENTS

| | | |
|---|---|---|
| 4,224,644 A | 9/1980 | Lewis et al. |
| 4,264,924 A | 4/1981 | Freeman |
| 4,264,925 A | 4/1981 | Freeman et al. |
| 4,267,563 A | 5/1981 | Sato et al. |
| 4,271,532 A | 6/1981 | Wine |
| 4,280,148 A | 7/1981 | Saxena |
| 4,288,809 A | 9/1981 | Yabe |
| 4,310,924 A | 1/1982 | Miyasaka et al. |
| 4,325,081 A | 4/1982 | Abe et al. |
| 4,329,684 A | 5/1982 | Monteath et al. |
| 4,334,242 A | 6/1982 | Mangold |
| 4,337,480 A | 6/1982 | Bourassin et al. |
| 4,338,644 A | 7/1982 | Staar |
| 4,339,798 A | 7/1982 | Hedges et al. |
| 4,347,498 A | 8/1982 | Lee et al. |
| 4,355,415 A | 10/1982 | George et al. |
| 4,367,559 A | 1/1983 | Tults |
| 4,375,651 A | 3/1983 | Templin et al. |
| 4,381,522 A | 4/1983 | Lambert |
| 4,390,901 A | 6/1983 | Keiser |
| 4,422,105 A | 12/1983 | Rodesch et al. |
| 4,425,579 A | 1/1984 | Merrell |
| 4,429,385 A | 1/1984 | Cichelli et al. |
| 4,435,842 A | 3/1984 | Mayumi et al. |
| 4,449,249 A | 5/1984 | Price |
| 4,475,153 A | 10/1984 | Kihara et al. |
| 4,488,179 A | 12/1984 | Kruger et al. |
| 4,495,654 A | 1/1985 | Deiss |
| 4,496,171 A | 1/1985 | Cherry |
| 4,519,003 A | 5/1985 | Scholz |
| 4,527,194 A | 7/1985 | Sirazi |
| 4,535,333 A | 8/1985 | Twardowski |
| 4,573,072 A | 2/1986 | Freeman |
| 4,593,414 A | 6/1986 | Koyanagi |
| 4,598,288 A | 7/1986 | Yarbrough et al. |
| 4,602,279 A | 7/1986 | Freeman |
| 4,605,964 A | 8/1986 | Chard |
| 4,605,973 A | 8/1986 | Von Kohorn |
| 4,620,229 A | 10/1986 | Amano et al. |
| 4,621,259 A | 11/1986 | Schepers et al. |
| 4,625,080 A | 11/1986 | Scott |
| 4,626,848 A | 12/1986 | Ehlers |
| 4,630,108 A | 12/1986 | Gomersall |
| 4,631,601 A | 12/1986 | Brugliera et al. |
| 4,635,121 A | 1/1987 | Hoffman et al. |
| 4,638,359 A | 1/1987 | Watson |
| 4,641,205 A | 2/1987 | Beyers, Jr. |
| 4,689,022 A | 8/1987 | Peers et al. |
| 4,691,351 A | 9/1987 | Hayashi et al. |
| 4,694,490 A | 9/1987 | Harvey et al. |
| 4,701,794 A | 10/1987 | Froling et al. |
| 4,703,359 A | 10/1987 | Rumbolt et al. |
| 4,706,121 A | 11/1987 | Young |
| 4,718,107 A | 1/1988 | Hayes |
| 4,718,112 A | 1/1988 | Shinoda |
| 4,739,406 A | 4/1988 | Morton et al. |
| 4,751,578 A | 6/1988 | Reiter et al. |
| 4,754,326 A | 6/1988 | Kram et al. |
| 4,755,883 A | 7/1988 | Uehira |
| 4,761,684 A | 8/1988 | Clark et al. |
| 4,787,063 A | 11/1988 | Muguet |
| 4,789,962 A | 12/1988 | Berry et al. |
| 4,792,848 A | 12/1988 | Nussrallah et al. |
| 4,807,031 A | 2/1989 | Broughton et al. |
| 4,807,052 A | 2/1989 | Amano |
| 4,809,325 A | 2/1989 | Hayashi et al. |
| 4,812,940 A | 3/1989 | Takenaga |
| 4,825,200 A | 4/1989 | Evans et al. |
| 4,841,368 A | 6/1989 | Rumbolt et al. |
| 4,841,562 A | 6/1989 | Lem |
| 4,843,482 A | 6/1989 | Hegendorfer |
| 4,847,696 A | 7/1989 | Matsumoto et al. |
| 4,847,698 A | 7/1989 | Freeman |
| 4,847,700 A | 7/1989 | Freeman |
| 4,855,833 A | 8/1989 | Kageyama et al. |
| 4,857,999 A | 8/1989 | Welsh |
| 4,866,434 A | 9/1989 | Keenan |
| 4,873,584 A | 10/1989 | Hashimoto |
| 4,877,455 A | 10/1989 | Brauer et al. |
| 4,879,611 A | 11/1989 | Fukui et al. |
| 4,882,732 A | 11/1989 | Kaminaga |
| 4,885,579 A | 12/1989 | Sandbank |
| 4,885,775 A | 12/1989 | Lucas |
| 4,894,789 A | 1/1990 | Yee |
| 4,899,370 A | 2/1990 | Kamco et al. |
| 4,905,094 A | 2/1990 | Pocock et al. |
| 4,908,707 A | 3/1990 | Kinghorn |
| 4,908,713 A | 3/1990 | Levine |
| 4,920,432 A | 4/1990 | Eggers et al. |
| 4,930,158 A | 5/1990 | Vogel |
| 4,937,863 A | 6/1990 | Robert et al. |
| 4,945,563 A | 7/1990 | Horton et al. |
| 4,947,244 A | 8/1990 | Fenwick et al. |
| 4,947,429 A | 8/1990 | Bestler et al. |
| 4,959,719 A | 9/1990 | Strubbe et al. |
| 4,959,720 A | 9/1990 | Duffield et al. |
| 4,963,994 A | 10/1990 | Levine |
| 4,965,825 A | 10/1990 | Harvey et al. |
| 4,977,455 A | 12/1990 | Young |
| 4,989,104 A | 1/1991 | Schulein et al. |
| 4,991,011 A | 2/1991 | Johnson et al. |
| 4,992,940 A | 2/1991 | Dworkin |
| 4,994,908 A | 2/1991 | Kuban et al. |
| 4,998,292 A | 3/1991 | Eigeldinger et al. |
| 5,001,554 A | 3/1991 | Johnson et al. |
| 5,012,409 A | 4/1991 | Fletcher et al. |
| 5,016,273 A | 5/1991 | Hoff |
| 5,027,400 A | 6/1991 | Baji et al. |
| 5,036,314 A | 7/1991 | Barillari et al. |
| 5,038,211 A | 8/1991 | Hallenbeck |
| 5,047,867 A | 9/1991 | Strubbe et al. |
| 5,065,235 A | 11/1991 | Iijima |
| 5,068,733 A | 11/1991 | Bennett |
| 5,068,734 A | 11/1991 | Beery |
| 5,075,771 A | 12/1991 | Hashimoto et al. |
| 5,077,607 A | 12/1991 | Johnson et al. |
| 5,086,385 A | 2/1992 | Launey et al. |
| 5,089,885 A | 2/1992 | Clark |
| 5,090,049 A | 2/1992 | Chen |
| 5,105,184 A | 4/1992 | Pirani et al. |
| 5,109,279 A | 4/1992 | Ando |
| 5,113,259 A | 5/1992 | Romesburg et al. |
| 5,119,577 A | 6/1992 | Lilly |
| 5,123,046 A | 6/1992 | Levine |
| 5,126,851 A | 6/1992 | Yoshimura et al. |
| 5,132,992 A | 7/1992 | Yurt et al. |
| 5,134,649 A | 7/1992 | Gutzmer |
| 5,134,719 A | 7/1992 | Mankovitz |
| 5,151,789 A | 9/1992 | Young |
| 5,155,591 A | 10/1992 | Wachob |
| 5,168,353 A | 12/1992 | Walker et al. |
| 5,170,388 A | 12/1992 | Endoh |
| 5,172,111 A | 12/1992 | Olivo |
| 5,172,413 A | 12/1992 | Bradley et al. |
| 5,179,439 A | 1/1993 | Hashimoto |
| 5,187,589 A | 2/1993 | Kono et al. |
| 5,189,630 A | 2/1993 | Barstow et al. |
| 5,191,423 A | 3/1993 | Yoshida et al. |
| 5,195,134 A | 3/1993 | Inoue et al. |
| 5,200,822 A | 4/1993 | Bronfin et al. |
| 5,202,915 A | 4/1993 | Nishii |
| 5,204,897 A | 4/1993 | Wyman |
| 5,208,665 A | 5/1993 | McCalley et al. |
| 5,210,611 A | 5/1993 | Yee et al. |
| 5,216,228 A | 6/1993 | Hashimoto |
| 5,223,924 A | 6/1993 | Strubbe |
| 5,228,077 A | 7/1993 | Darbee |
| 5,231,493 A | 7/1993 | Apitz |
| 5,231,494 A | 7/1993 | Wachob |
| RE34,340 E | 8/1993 | Freeman |
| 5,233,423 A | 8/1993 | Jernigan et al. |
| 5,237,157 A | 8/1993 | Kaplan |
| 5,239,654 A | 8/1993 | Ing-Simmons et al. |
| 5,241,428 A | 8/1993 | Goldwasser et al. |

(56) References Cited

U.S. PATENT DOCUMENTS

| | | |
|---|---|---|
| 5,249,043 A | 9/1993 | Grandmougin et al. |
| 5,249,044 A | 9/1993 | Von Kohorn |
| 5,251,921 A | 10/1993 | Daniels |
| 5,253,066 A | 10/1993 | Vogel |
| 5,253,275 A | 10/1993 | Yurt et al. |
| 5,260,788 A | 11/1993 | Takano |
| 5,260,999 A | 11/1993 | Wyman |
| 5,262,860 A | 11/1993 | Fitzpatrick et al. |
| 4,706,121 B1 | 12/1993 | Young |
| 5,283,819 A | 2/1994 | Glick et al. |
| 5,285,284 A | 2/1994 | Takashima et al. |
| 5,293,357 A | 3/1994 | Hallenbeck |
| 5,296,931 A | 3/1994 | Na |
| 5,307,173 A | 4/1994 | Yuen et al. |
| 5,311,423 A | 5/1994 | Clark |
| 5,317,403 A | 5/1994 | Keenan |
| 5,319,445 A | 6/1994 | Fitts |
| 5,323,234 A | 6/1994 | Kawasaki |
| 5,323,240 A | 6/1994 | Amano et al. |
| 5,325,183 A | 6/1994 | Rhee et al. |
| 5,325,423 A | 6/1994 | Lewis |
| 5,335,079 A | 8/1994 | Yuen et al. |
| 5,335,277 A | 8/1994 | Harvey et al. |
| 5,343,239 A | 8/1994 | Lappington et al. |
| 5,345,430 A | 9/1994 | Moe |
| 5,347,167 A | 9/1994 | Singh |
| 5,347,632 A | 9/1994 | Filepp et al. |
| 5,351,075 A | 9/1994 | Herz et al. |
| 5,353,121 A | 10/1994 | Young et al. |
| 5,357,276 A | 10/1994 | Banker et al. |
| 5,359,367 A | 10/1994 | Stockill |
| 5,371,551 A | 12/1994 | Logan et al. |
| 5,377,317 A | 12/1994 | Bates et al. |
| 5,382,983 A | 1/1995 | Kwoh et al. |
| 5,396,546 A | 3/1995 | Remillard |
| 5,398,074 A | 3/1995 | Duffield et al. |
| 5,398,138 A | 3/1995 | Tomita |
| 5,404,393 A | 4/1995 | Remillard |
| 5,410,326 A | 4/1995 | Goldstein |
| 5,410,344 A | 4/1995 | Graves et al. |
| 5,410,367 A | 4/1995 | Zahavi et al. |
| 5,412,720 A | 5/1995 | Hoarty |
| 5,414,756 A | 5/1995 | Levine |
| 5,416,508 A | 5/1995 | Sakuma et al. |
| 5,432,561 A | 7/1995 | Strubbe |
| 5,440,678 A | 8/1995 | Eisen et al. |
| 5,442,389 A | 8/1995 | Blahut et al. |
| 5,444,499 A | 8/1995 | Saitoh et al. |
| 5,446,919 A | 8/1995 | Wilkins |
| 5,447,262 A | 9/1995 | Focke et al. |
| 5,450,135 A | 9/1995 | Schick |
| 5,451,998 A | 9/1995 | Hamrick |
| 5,455,570 A | 10/1995 | Cook et al. |
| 5,459,522 A | 10/1995 | Pint |
| 5,461,415 A | 10/1995 | Wolf et al. |
| 5,465,113 A | 11/1995 | Gilboy |
| 5,465,385 A | 11/1995 | Ohga et al. |
| 5,467,264 A | 11/1995 | Rauch et al. |
| 5,469,206 A | 11/1995 | Strubbe et al. |
| 5,477,262 A | 12/1995 | Banker et al. |
| 5,479,266 A | 12/1995 | Young et al. |
| 5,479,268 A | 12/1995 | Young et al. |
| 5,479,302 A | 12/1995 | Haines |
| 5,479,497 A | 12/1995 | Kovarik |
| 5,481,094 A | 1/1996 | Suda |
| 5,481,296 A | 1/1996 | Cragun et al. |
| 5,483,278 A | 1/1996 | Strubbe et al. |
| 5,485,197 A | 1/1996 | Hoarty |
| 5,485,219 A | 1/1996 | Woo et al. |
| 5,485,221 A | 1/1996 | Banker et al. |
| 5,485,518 A | 1/1996 | Hunter et al. |
| 5,488,409 A | 1/1996 | Yuen et al. |
| 5,497,185 A | 3/1996 | Dufresne et al. |
| 5,502,504 A | 3/1996 | Marshall et al. |
| 5,504,519 A | 4/1996 | Remillard |
| 5,508,815 A | 4/1996 | Levine |
| 5,515,106 A | 5/1996 | Chaney et al. |
| 5,515,511 A | 5/1996 | Nguyen et al. |
| 5,517,254 A | 5/1996 | Monta et al. |
| 5,517,256 A | 5/1996 | Hashimoto |
| 5,517,257 A | 5/1996 | Dunn et al. |
| 5,523,794 A | 6/1996 | Mankovitz et al. |
| 5,523,796 A | 6/1996 | Marshall et al. |
| 5,524,195 A | 6/1996 | Clanton, III et al. |
| 5,526,034 A | 6/1996 | Hoarty et al. |
| 5,528,304 A | 6/1996 | Cherrick et al. |
| 5,530,684 A | 6/1996 | Kataoka et al. |
| 5,532,754 A | 7/1996 | Young et al. |
| 5,532,832 A | 7/1996 | Hailey et al. |
| 5,534,911 A | 7/1996 | Levitan |
| 5,537,141 A | 7/1996 | Harper et al. |
| 5,539,449 A | 7/1996 | Blahut et al. |
| 5,539,635 A | 7/1996 | Larson, Jr. |
| 5,539,822 A | 7/1996 | Lett |
| 5,541,662 A | 7/1996 | Adams et al. |
| 5,543,856 A | 8/1996 | Rosser et al. |
| 5,546,193 A | 8/1996 | Hailey et al. |
| 5,548,345 A | 8/1996 | Brian et al. |
| 5,550,575 A | 8/1996 | West et al. |
| 5,550,576 A | 8/1996 | Klosterman |
| 5,550,863 A | 8/1996 | Yurt et al. |
| 5,552,833 A | 9/1996 | Henmi et al. |
| 5,553,123 A | 9/1996 | Chan et al. |
| 5,557,338 A | 9/1996 | Maze et al. |
| 5,559,548 A | 9/1996 | Davis et al. |
| 5,559,549 A | 9/1996 | Hendricks et al. |
| 5,559,550 A | 9/1996 | Mankovitz |
| 5,561,708 A | 10/1996 | Remillard |
| 5,561,709 A | 10/1996 | Remillard |
| 5,563,665 A | 10/1996 | Chang |
| 5,568,272 A | 10/1996 | Levine |
| 5,570,295 A | 10/1996 | Isenberg et al. |
| 5,570,415 A | 10/1996 | Stretton et al. |
| 5,572,442 A | 11/1996 | Schulhof et al. |
| 5,576,755 A | 11/1996 | Davis et al. |
| 5,579,239 A | 11/1996 | Freeman et al. |
| 5,581,479 A | 12/1996 | McLaughlin et al. |
| 5,583,560 A | 12/1996 | Florin et al. |
| 5,583,561 A | 12/1996 | Baker et al. |
| 5,583,563 A | 12/1996 | Wanderscheid et al. |
| 5,583,653 A | 12/1996 | Timmermans et al. |
| 5,583,763 A | 12/1996 | Atcheson et al. |
| 5,585,838 A | 12/1996 | Lawler et al. |
| 5,585,858 A | 12/1996 | Harper et al. |
| 5,585,865 A | 12/1996 | Amano et al. |
| 5,585,866 A | 12/1996 | Miller et al. |
| 5,589,892 A | 12/1996 | Knee et al. |
| 5,592,482 A | 1/1997 | Abraham |
| 5,592,551 A | 1/1997 | Lett et al. |
| 5,594,490 A | 1/1997 | Dawson et al. |
| 5,594,491 A | 1/1997 | Hodge et al. |
| 5,594,509 A | 1/1997 | Florin |
| 5,594,661 A | 1/1997 | Bruner et al. |
| 5,596,361 A | 1/1997 | Martinez |
| 5,596,373 A | 1/1997 | White et al. |
| 5,596,419 A | 1/1997 | Yoshimura et al. |
| 5,598,523 A | 1/1997 | Fujita |
| 5,600,364 A | 2/1997 | Hendricks et al. |
| 5,602,582 A | 2/1997 | Wanderscheid et al. |
| 5,606,374 A | 2/1997 | Bertram |
| 5,606,726 A | 2/1997 | Yoshinobu |
| 5,610,653 A | 3/1997 | Abecassis |
| 5,617,526 A | 4/1997 | Oran et al. |
| 5,617,565 A | 4/1997 | Augenbraun et al. |
| 5,619,247 A | 4/1997 | Russo |
| 5,619,249 A | 4/1997 | Billock et al. |
| 5,619,274 A | 4/1997 | Roop et al. |
| 5,621,456 A | 4/1997 | Florin et al. |
| 5,621,579 A | 4/1997 | Yuen |
| 5,623,613 A | 4/1997 | Rowe et al. |
| 5,625,406 A | 4/1997 | Newberry et al. |
| 5,625,464 A | 4/1997 | Compoint et al. |
| 5,627,940 A | 5/1997 | Rohra et al. |
| 5,629,733 A | 5/1997 | Youman et al. |

(56) References Cited

U.S. PATENT DOCUMENTS

| | | |
|---|---|---|
| 5,630,119 A | 5/1997 | Aristides et al. |
| 5,631,995 A | 5/1997 | Weissensteiner et al. |
| 5,632,007 A | 5/1997 | Freeman |
| 5,635,978 A | 6/1997 | Alten |
| 5,635,979 A | 6/1997 | Kostreski et al. |
| 5,635,989 A | 6/1997 | Rothmuller |
| 5,640,484 A | 6/1997 | Mankovitz |
| 5,640,501 A | 6/1997 | Turpin |
| 5,640,577 A | 6/1997 | Scharmer |
| 5,648,824 A | 7/1997 | Dunn et al. |
| 5,650,826 A | 7/1997 | Eitz et al. |
| 5,650,831 A | 7/1997 | Farwell |
| 5,652,613 A | 7/1997 | Lazarus et al. |
| 5,652,615 A | 7/1997 | Bryant et al. |
| 5,654,748 A | 8/1997 | Matthews, III |
| 5,654,886 A | 8/1997 | Zereski, Jr. et al. |
| 5,655,214 A | 8/1997 | Mullett et al. |
| 5,657,072 A | 8/1997 | Aristides et al. |
| 5,657,414 A | 8/1997 | Lett et al. |
| 5,659,350 A | 8/1997 | Hendricks et al. |
| 5,659,367 A | 8/1997 | Yuen |
| 5,661,516 A | 8/1997 | Carles |
| 5,661,517 A | 8/1997 | Budow et al. |
| 5,663,757 A | 9/1997 | Morales |
| 5,664,111 A | 9/1997 | Nahan et al. |
| 5,666,293 A | 9/1997 | Metz et al. |
| 5,666,498 A | 9/1997 | Amro |
| 5,666,645 A | 9/1997 | Thomas et al. |
| 5,671,276 A | 9/1997 | Eyer et al. |
| 5,671,411 A | 9/1997 | Watts et al. |
| 5,671,607 A | 9/1997 | Clemens et al. |
| 5,675,390 A | 10/1997 | Schindler et al. |
| 5,677,708 A | 10/1997 | Matthews, III et al. |
| 5,677,981 A | 10/1997 | Kato et al. |
| 5,682,206 A | 10/1997 | Wehmeyer et al. |
| 5,684,525 A | 11/1997 | Klosterman |
| 5,686,954 A | 11/1997 | Yoshinobu et al. |
| 5,689,666 A | 11/1997 | Berquist et al. |
| 5,692,214 A | 11/1997 | Levine |
| 5,692,335 A | 12/1997 | Magnuson |
| 5,694,163 A | 12/1997 | Harrison |
| 5,694,176 A | 12/1997 | Bruette et al. |
| 5,694,381 A | 12/1997 | Sako et al. |
| 5,696,695 A | 12/1997 | Ehlers et al. |
| 5,696,824 A | 12/1997 | Walsh |
| 5,696,905 A | 12/1997 | Reimer et al. |
| 5,699,052 A | 12/1997 | Miyahara |
| 5,699,107 A | 12/1997 | Lawler et al. |
| 5,699,125 A | 12/1997 | Rzeszewski et al. |
| 5,706,191 A | 1/1998 | Bassett et al. |
| 5,710,601 A | 1/1998 | Marshall et al. |
| 5,710,605 A | 1/1998 | Nelson |
| 5,710,884 A | 1/1998 | Dedrick |
| 5,715,020 A | 2/1998 | Kuroiwa et al. |
| 5,715,314 A | 2/1998 | Payne et al. |
| 5,715,399 A | 2/1998 | Bezos |
| 5,717,452 A | 2/1998 | Janin et al. |
| 5,717,923 A | 2/1998 | Dedrick |
| 5,721,829 A | 2/1998 | Dunn et al. |
| 5,722,041 A | 2/1998 | Freadman |
| 5,724,091 A | 3/1998 | Freeman et al. |
| 5,724,103 A | 3/1998 | Batchelor |
| 5,724,521 A | 3/1998 | Dedrick |
| 5,724,567 A | 3/1998 | Rose et al. |
| 5,727,060 A | 3/1998 | Young |
| 5,727,163 A | 3/1998 | Bezos |
| 5,731,844 A | 3/1998 | Rauch et al. |
| 5,732,216 A | 3/1998 | Logan et al. |
| 5,734,720 A | 3/1998 | Salganicoff |
| 5,734,853 A | 3/1998 | Hendricks et al. |
| 5,734,893 A | 3/1998 | Li et al. |
| 5,742,563 A | 4/1998 | Kataoka et al. |
| 5,742,905 A | 4/1998 | Pepe et al. |
| 5,745,710 A | 4/1998 | Clanton, III et al. |
| 5,748,191 A | 5/1998 | Rozak et al. |
| 5,748,716 A | 5/1998 | Levine |
| 5,748,732 A | 5/1998 | Le Berre et al. |
| 5,751,282 A | 5/1998 | Girard et al. |
| 5,752,159 A | 5/1998 | Faust et al. |
| 5,752,160 A | 5/1998 | Dunn |
| 5,754,771 A | 5/1998 | Epperson et al. |
| 5,754,938 A | 5/1998 | Herz et al. |
| 5,754,939 A | 5/1998 | Herz et al. |
| 5,758,257 A | 5/1998 | Herz et al. |
| 5,758,258 A | 5/1998 | Shoff et al. |
| 5,758,259 A | 5/1998 | Lawler |
| 5,759,101 A | 6/1998 | Von Kohorn |
| 5,760,821 A | 6/1998 | Ellis et al. |
| 5,761,372 A | 6/1998 | Yoshinobu et al. |
| 5,761,606 A | 6/1998 | Wolzien |
| 5,761,607 A | 6/1998 | Gudesen |
| 5,768,528 A | 6/1998 | Stumm |
| 5,771,275 A | 6/1998 | Brunner et al. |
| 5,771,354 A | 6/1998 | Crawford |
| 5,774,357 A | 6/1998 | Hoffberg et al. |
| 5,774,539 A | 6/1998 | Maass et al. |
| 5,774,664 A | 6/1998 | Hidary et al. |
| 5,774,666 A | 6/1998 | Portuesi |
| 5,774,859 A | 6/1998 | Houser et al. |
| 5,778,181 A | 7/1998 | Hidary et al. |
| 5,778,182 A | 7/1998 | Cathey et al. |
| 5,781,226 A | 7/1998 | Sheehan |
| 5,781,228 A | 7/1998 | Sposato |
| 5,781,246 A | 7/1998 | Alten et al. |
| 5,781,734 A | 7/1998 | Ohno et al. |
| 5,787,259 A | 7/1998 | Haroun et al. |
| 5,788,507 A | 8/1998 | Redford et al. |
| 5,790,198 A | 8/1998 | Roop et al. |
| 5,790,201 A | 8/1998 | Antos |
| 5,790,202 A | 8/1998 | Kummer et al. |
| 5,790,753 A | 8/1998 | Krishnamoorthy et al. |
| 5,793,964 A | 8/1998 | Rogers et al. |
| 5,793,972 A | 8/1998 | Shane et al. |
| 5,796,952 A | 8/1998 | Davis et al. |
| 5,798,785 A | 8/1998 | Hendricks et al. |
| 5,801,747 A | 9/1998 | Bedard |
| 5,801,787 A | 9/1998 | Schein et al. |
| 5,802,284 A | 9/1998 | Karlton et al. |
| 5,805,155 A | 9/1998 | Allibhoy et al. |
| 5,805,204 A | 9/1998 | Thompson et al. |
| 5,805,763 A | 9/1998 | Lawler et al. |
| 5,805,804 A | 9/1998 | Laursen et al. |
| 5,805,806 A | 9/1998 | McArthur |
| 5,808,608 A | 9/1998 | Young et al. |
| 5,808,694 A | 9/1998 | Usui et al. |
| 5,809,204 A | 9/1998 | Young et al. |
| 5,809,214 A | 9/1998 | Nureki et al. |
| 5,812,123 A | 9/1998 | Rowe et al. |
| 5,812,205 A | 9/1998 | Milnes et al. |
| 5,812,930 A | 9/1998 | Zavrel |
| 5,812,931 A | 9/1998 | Yuen |
| 5,812,937 A | 9/1998 | Takahisa et al. |
| 5,818,438 A | 10/1998 | Howe et al. |
| 5,818,441 A | 10/1998 | Throckmorton et al. |
| 5,818,511 A | 10/1998 | Farry et al. |
| 5,818,935 A | 10/1998 | Maa |
| 5,819,019 A | 10/1998 | Nelson |
| 5,819,034 A | 10/1998 | Joseph et al. |
| 5,819,156 A | 10/1998 | Belmont |
| 5,822,123 A | 10/1998 | Davis et al. |
| 5,822,606 A | 10/1998 | Morton |
| 5,828,420 A | 10/1998 | Marshall et al. |
| 5,828,839 A | 10/1998 | Moncreiff |
| 5,828,945 A | 10/1998 | Klosterman |
| RE35,954 E | 11/1998 | Levine |
| 5,832,223 A | 11/1998 | Hara et al. |
| 5,833,468 A | 11/1998 | Guy et al. |
| 5,835,717 A | 11/1998 | Karlton et al. |
| 5,838,314 A | 11/1998 | Neel et al. |
| 5,838,383 A | 11/1998 | Chimoto et al. |
| 5,844,552 A | 12/1998 | Gaughan et al. |
| 5,844,620 A | 12/1998 | Coleman et al. |
| 5,846,704 A | 12/1998 | Maertens et al. |
| 5,848,396 A | 12/1998 | Gerace |

(56) References Cited

U.S. PATENT DOCUMENTS

| | | |
|---|---|---|
| 5,850,218 A | 12/1998 | LaJoie |
| 5,851,149 A | 12/1998 | Xidos et al. |
| 5,852,437 A | 12/1998 | Wugofski et al. |
| 5,861,881 A | 1/1999 | Freeman et al. |
| 5,861,906 A | 1/1999 | Dunn et al. |
| 5,862,292 A | 1/1999 | Kubota et al. |
| 5,864,823 A | 1/1999 | Levitan |
| 5,867,223 A | 2/1999 | Schindler et al. |
| 5,867,226 A | 2/1999 | Wehmeyer et al. |
| 5,867,233 A | 2/1999 | Tanaka |
| 5,867,799 A | 2/1999 | Lang et al. |
| 5,873,660 A | 2/1999 | Walsh et al. |
| 5,875,108 A | 2/1999 | Hoffberg et al. |
| 5,877,906 A | 3/1999 | Nagasawa et al. |
| 5,878,222 A | 3/1999 | Harrison |
| 5,880,768 A | 3/1999 | Lemmons et al. |
| 5,883,621 A | 3/1999 | Iwamura |
| 5,884,298 A | 3/1999 | Smith, II et al. |
| 5,886,732 A | 3/1999 | Humpleman |
| 5,889,950 A | 3/1999 | Kuzma |
| 5,892,767 A | 4/1999 | Bell et al. |
| 5,899,920 A | 5/1999 | DeSatnick et al. |
| 5,900,867 A | 5/1999 | Schindler et al. |
| 5,901,366 A | 5/1999 | Nakano et al. |
| 5,903,545 A | 5/1999 | Sabourin et al. |
| 5,903,816 A | 5/1999 | Broadwin et al. |
| 5,907,322 A | 5/1999 | Kelly et al. |
| 5,907,323 A | 5/1999 | Lawler et al. |
| 5,912,664 A | 6/1999 | Eick et al. |
| 5,914,712 A | 6/1999 | Sartain et al. |
| 5,914,746 A | 6/1999 | Matthews, III et al. |
| 5,915,068 A | 6/1999 | Levine |
| 5,917,405 A | 6/1999 | Joao |
| 5,923,848 A | 7/1999 | Goodhand et al. |
| 5,926,230 A | 7/1999 | Niijima et al. |
| 5,926,624 A | 7/1999 | Katz et al. |
| 5,929,849 A | 7/1999 | Kikinis |
| 5,929,932 A | 7/1999 | Otsuki et al. |
| 5,931,905 A | 8/1999 | Hashimoto et al. |
| 5,936,428 A | 8/1999 | Merritt et al. |
| 5,937,160 A | 8/1999 | Davis et al. |
| 5,940,073 A | 8/1999 | Klosterman et al. |
| 5,940,572 A | 8/1999 | Balaban et al. |
| 5,943,467 A | 8/1999 | Beyers et al. |
| 5,945,987 A | 8/1999 | Dunn |
| 5,945,988 A | 8/1999 | Williams et al. |
| 5,946,386 A | 8/1999 | Rogers et al. |
| 5,949,954 A | 9/1999 | Young |
| 5,955,988 A | 9/1999 | Blonstein et al. |
| 5,956,025 A | 9/1999 | Goulden et al. |
| 5,959,592 A | 9/1999 | Petruzzelli |
| 5,960,411 A | 9/1999 | Hartman et al. |
| 5,963,264 A | 10/1999 | Jackson |
| 5,963,645 A | 10/1999 | Kigawa et al. |
| 5,969,748 A | 10/1999 | Casement et al. |
| 5,970,473 A | 10/1999 | Gerszberg et al. |
| 5,970,486 A | 10/1999 | Yoshida et al. |
| 5,973,683 A | 10/1999 | Cragun et al. |
| 5,974,222 A | 10/1999 | Yuen et al. |
| 5,977,964 A | 11/1999 | Williams et al. |
| 5,982,411 A | 11/1999 | Eyer et al. |
| 5,987,213 A | 11/1999 | Mankovitz et al. |
| 5,987,509 A | 11/1999 | Portuesi |
| 5,988,078 A | 11/1999 | Levine |
| 5,990,885 A | 11/1999 | Gopinath |
| 5,990,927 A | 11/1999 | Hendricks et al. |
| 5,991,498 A | 11/1999 | Young |
| 5,991,799 A | 11/1999 | Yen et al. |
| 5,991,832 A | 11/1999 | Sato et al. |
| 5,995,092 A | 11/1999 | Yuen et al. |
| 5,995,155 A | 11/1999 | Schindler et al. |
| 6,002,394 A | 12/1999 | Schein et al. |
| 6,002,450 A | 12/1999 | Darbee et al. |
| 6,005,561 A | 12/1999 | Hawkins et al. |
| 6,005,563 A | 12/1999 | White et al. |
| 6,005,565 A | 12/1999 | Legall et al. |
| 6,005,597 A | 12/1999 | Barrett et al. |
| 6,005,631 A | 12/1999 | Anderson et al. |
| 6,006,257 A | 12/1999 | Slezak |
| 6,008,802 A | 12/1999 | Iki et al. |
| 6,008,803 A | 12/1999 | Rowe et al. |
| 6,009,153 A | 12/1999 | Houghton et al. |
| 6,009,465 A | 12/1999 | Decker et al. |
| 6,012,086 A | 1/2000 | Lowell |
| 6,014,184 A | 1/2000 | Knee et al. |
| 6,016,141 A | 1/2000 | Knudson et al. |
| 6,018,372 A | 1/2000 | Etheredge |
| 6,020,880 A | 2/2000 | Naimpally |
| 6,020,883 A | 2/2000 | Herz et al. |
| 6,023,267 A | 2/2000 | Chapuis et al. |
| 6,025,837 A | 2/2000 | Matthews, III et al. |
| 6,025,869 A | 2/2000 | Stas et al. |
| 6,029,046 A | 2/2000 | Khan et al. |
| 6,029,195 A | 2/2000 | Herz |
| 6,031,806 A | 2/2000 | Tomita et al. |
| 6,035,339 A | 3/2000 | Agraharam et al. |
| 6,038,367 A | 3/2000 | Abecassis |
| 6,040,829 A | 3/2000 | Croy et al. |
| 6,049,823 A | 4/2000 | Hwang |
| 6,052,145 A | 4/2000 | Macrae et al. |
| 6,057,872 A | 5/2000 | Candelore |
| 6,057,890 A | 5/2000 | Virden et al. |
| 6,058,238 A | 5/2000 | Ng et al. |
| 6,058,242 A | 5/2000 | Kim |
| 6,061,779 A | 5/2000 | Garde |
| 6,064,980 A | 5/2000 | Jacobi et al. |
| 6,067,561 A | 5/2000 | Dillon |
| 6,072,460 A | 6/2000 | Marshall et al. |
| 6,075,526 A | 6/2000 | Rothmuller |
| 6,075,568 A | 6/2000 | Matsuura |
| 6,078,348 A | 6/2000 | Klosterman et al. |
| 6,081,291 A | 6/2000 | Ludwig, Jr. |
| 6,081,750 A | 6/2000 | Hoffberg et al. |
| 6,083,367 A | 7/2000 | Suzuki |
| 6,088,722 A | 7/2000 | Herz et al. |
| 6,088,945 A | 7/2000 | Sanderfoot |
| 6,091,883 A | 7/2000 | Artigalas et al. |
| 6,091,884 A | 7/2000 | Yuen et al. |
| RE36,801 E | 8/2000 | Logan et al. |
| 6,097,441 A | 8/2000 | Allport |
| 6,098,065 A | 8/2000 | Skillen et al. |
| 6,104,334 A | 8/2000 | Allport |
| 6,104,705 A | 8/2000 | Ismail et al. |
| 6,108,516 A | 8/2000 | Kuether |
| 6,125,230 A | 9/2000 | Yaginuma et al. |
| 6,130,726 A | 10/2000 | Darbee et al. |
| 6,133,847 A | 10/2000 | Yang |
| 6,133,909 A | 10/2000 | Schein et al. |
| 6,133,910 A | 10/2000 | Stinebruner |
| 6,139,177 A | 10/2000 | Venkatraman et al. |
| 6,141,488 A | 10/2000 | Knudson et al. |
| 6,144,401 A | 11/2000 | Casement et al. |
| 6,144,702 A | 11/2000 | Yurt et al. |
| 6,147,715 A | 11/2000 | Yuen et al. |
| 6,151,059 A | 11/2000 | Schein et al. |
| 6,151,643 A | 11/2000 | Cheng et al. |
| 6,154,771 A | 11/2000 | Rangan et al. |
| 6,155,001 A | 12/2000 | Marin |
| 6,157,411 A | 12/2000 | Williams et al. |
| 6,157,413 A | 12/2000 | Hanafee et al. |
| 6,160,988 A | 12/2000 | Shroyer |
| 6,163,316 A | 12/2000 | Killian |
| 6,163,345 A | 12/2000 | Noguchi et al. |
| 6,166,778 A | 12/2000 | Yamamoto et al. |
| 6,167,188 A | 12/2000 | Young et al. |
| 6,169,543 B1 | 1/2001 | Wehmeyer |
| 6,172,674 B1 | 1/2001 | Etheredge |
| 6,172,677 B1 | 1/2001 | Stautner et al. |
| 6,177,931 B1 | 1/2001 | Alexander |
| 6,181,335 B1 | 1/2001 | Hendricks et al. |
| 6,182,094 B1 | 1/2001 | Humpleman et al. |
| 6,184,877 B1 | 2/2001 | Dodson et al. |
| 6,185,360 B1 | 2/2001 | Inoue et al. |
| 6,188,325 B1 | 2/2001 | Vogel |

(56) References Cited

U.S. PATENT DOCUMENTS

| | | |
|---|---|---|
| 6,188,381 B1 | 2/2001 | van der Wal et al. |
| 6,188,397 B1 | 2/2001 | Humpleman |
| 6,192,340 B1 | 2/2001 | Abecassis |
| 6,195,501 B1 | 2/2001 | Perry et al. |
| 6,202,211 B1 | 3/2001 | Williams, Jr. |
| 6,208,335 B1 | 3/2001 | Gordon et al. |
| 6,208,384 B1 | 3/2001 | Schultheiss |
| 6,208,799 B1 | 3/2001 | Marsh et al. |
| 6,212,327 B1 | 4/2001 | Berstis et al. |
| 6,212,553 B1 | 4/2001 | Lee et al. |
| 6,216,264 B1 | 4/2001 | Maze et al. |
| 6,219,839 B1 | 4/2001 | Sampsell |
| 6,226,447 B1 | 5/2001 | Sasaki et al. |
| 6,233,389 B1 | 5/2001 | Barton et al. |
| 6,233,734 B1 | 5/2001 | Macrae et al. |
| 6,237,049 B1 | 5/2001 | Ludtke |
| 6,239,794 B1 * | 5/2001 | Yuen et al. ............ 725/41 |
| 6,240,555 B1 | 5/2001 | Shoff et al. |
| 6,260,088 B1 | 7/2001 | Gove et al. |
| 6,262,772 B1 | 7/2001 | Shen et al. |
| 6,263,501 B1 | 7/2001 | Schein et al. |
| 6,263,507 B1 | 7/2001 | Ahmad et al. |
| 6,268,849 B1 | 7/2001 | Boyer et al. |
| 6,275,648 B1 | 8/2001 | Knudson et al. |
| 6,279,029 B1 | 8/2001 | Sampat et al. |
| 6,286,142 B1 | 9/2001 | Ehreth |
| 6,288,716 B1 | 9/2001 | Humpleman et al. |
| 6,292,624 B1 | 9/2001 | Saib et al. |
| 6,298,482 B1 | 10/2001 | Seidman et al. |
| 6,305,018 B1 | 10/2001 | Usui et al. |
| 6,307,398 B2 | 10/2001 | Merritt et al. |
| 6,310,886 B1 | 10/2001 | Barton |
| 6,311,011 B1 | 10/2001 | Kuroda et al. |
| 6,314,577 B1 | 11/2001 | Pocock |
| 6,317,881 B1 | 11/2001 | Shah-Nazaroff et al. |
| 6,317,884 B1 | 11/2001 | Eames et al. |
| 6,321,318 B1 | 11/2001 | Baltz et al. |
| 6,323,911 B1 | 11/2001 | Schein |
| 6,324,338 B1 | 11/2001 | Wood et al. |
| 6,326,982 B1 | 12/2001 | Wu et al. |
| 6,327,049 B1 | 12/2001 | Ohtsuka |
| 6,327,418 B1 | 12/2001 | Barton |
| 6,331,877 B1 | 12/2001 | Bennington et al. |
| 6,334,022 B1 | 12/2001 | Ohba et al. |
| 6,335,963 B1 | 1/2002 | Bosco |
| 6,336,099 B1 | 1/2002 | Barnett et al. |
| 6,341,374 B2 | 1/2002 | Schein et al. |
| 6,348,932 B1 | 2/2002 | Nishikawa |
| 6,357,043 B1 | 3/2002 | Ellis et al. |
| 6,359,636 B1 | 3/2002 | Schindler et al. |
| 6,362,942 B2 | 3/2002 | Drapkin et al. |
| 6,367,080 B1 | 4/2002 | Enomoto et al. |
| 6,373,528 B1 | 4/2002 | Bennington et al. |
| 6,374,406 B2 | 4/2002 | Hirata |
| 6,388,714 B1 | 5/2002 | Schein et al. |
| 6,389,464 B1 | 5/2002 | Krishnamurthy et al. |
| 6,396,544 B1 | 5/2002 | Schindler et al. |
| 6,397,080 B1 | 5/2002 | Viktorsson et al. |
| 6,408,437 B1 | 6/2002 | Hendricks et al. |
| 6,411,696 B1 | 6/2002 | Iverson et al. |
| 6,424,791 B1 | 7/2002 | Saib |
| 6,430,358 B1 | 8/2002 | Yuen et al. |
| 6,434,524 B1 | 8/2002 | Weber |
| 6,437,836 B1 | 8/2002 | Huang et al. |
| 6,441,832 B1 | 8/2002 | Tao et al. |
| 6,442,332 B1 | 8/2002 | Knudson et al. |
| 6,445,398 B1 | 9/2002 | Gerba et al. |
| RE37,881 E | 10/2002 | Haines |
| 6,463,585 B1 | 10/2002 | Hendricks et al. |
| 6,466,734 B2 * | 10/2002 | Yuen et al. ............ 386/83 |
| 6,472,905 B1 | 10/2002 | Manning |
| 6,473,559 B1 | 10/2002 | Knudson et al. |
| 6,480,667 B1 | 11/2002 | O'Connor |
| 6,480,889 B1 | 11/2002 | Saito et al. |
| 6,486,892 B1 | 11/2002 | Stern |
| 6,487,362 B1 | 11/2002 | Yuen et al. |
| 6,492,997 B1 | 12/2002 | Gerba et al. |
| 6,493,875 B1 | 12/2002 | Eames et al. |
| 6,498,895 B2 | 12/2002 | Young et al. |
| 6,505,348 B1 | 1/2003 | Knowles et al. |
| 6,507,953 B1 | 1/2003 | Horlander et al. |
| 6,509,908 B1 | 1/2003 | Croy et al. |
| 6,515,680 B1 | 2/2003 | Hendricks et al. |
| 6,516,467 B1 | 2/2003 | Schindler et al. |
| 6,526,575 B1 | 2/2003 | McCoy et al. |
| 6,530,083 B1 | 3/2003 | Liebenow |
| 6,539,548 B1 | 3/2003 | Hendricks et al. |
| 6,545,578 B2 | 4/2003 | Yoshiyama |
| 6,545,722 B1 | 4/2003 | Schultheiss et al. |
| 6,557,031 B1 | 4/2003 | Mimura et al. |
| 6,564,005 B1 | 5/2003 | Berstis |
| 6,564,379 B1 | 5/2003 | Knudson et al. |
| 6,564,383 B1 | 5/2003 | Combs et al. |
| 6,571,279 B1 | 5/2003 | Herz et al. |
| 6,601,074 B1 | 7/2003 | Liebenow |
| 6,603,488 B2 | 8/2003 | Humpleman et al. |
| 6,611,654 B1 | 8/2003 | Shteyn |
| 6,611,958 B1 | 8/2003 | Shintani et al. |
| 6,614,987 B1 | 9/2003 | Ismail et al. |
| 6,622,304 B1 | 9/2003 | Carhart |
| 6,661,468 B2 | 12/2003 | Alten et al. |
| 6,670,971 B1 | 12/2003 | Oral et al. |
| 6,674,958 B2 | 1/2004 | Wehmeyer et al. |
| 6,675,385 B1 | 1/2004 | Wang |
| 6,675,386 B1 | 1/2004 | Hendricks et al. |
| 6,681,396 B1 | 1/2004 | Bates et al. |
| 6,701,523 B1 | 3/2004 | Hancock et al. |
| 6,704,028 B2 | 3/2004 | Wugofski |
| 6,721,954 B1 | 4/2004 | Nickum |
| 6,727,914 B1 | 4/2004 | Gutta |
| 6,728,642 B2 | 4/2004 | Bloch et al. |
| 6,732,369 B1 | 5/2004 | Schein et al. |
| 6,732,372 B2 | 5/2004 | Tomita et al. |
| 6,738,978 B1 | 5/2004 | Hendricks et al. |
| 6,742,183 B1 | 5/2004 | Reynolds et al. |
| 6,744,967 B2 | 6/2004 | Kaminski et al. |
| 6,754,904 B1 | 6/2004 | Cooper et al. |
| 6,760,537 B2 | 7/2004 | Mankovitz |
| 6,760,538 B1 | 7/2004 | Bumgardner et al. |
| 6,766,100 B1 | 7/2004 | Komar et al. |
| 6,771,317 B2 | 8/2004 | Ellis et al. |
| 6,771,886 B1 | 8/2004 | Mendelsohn |
| 6,772,433 B1 | 8/2004 | LaJoie et al. |
| 6,788,882 B1 | 9/2004 | Geer et al. |
| 6,820,278 B1 | 11/2004 | Ellis |
| 6,828,993 B1 | 12/2004 | Hendricks et al. |
| 6,837,791 B1 | 1/2005 | McNutt et al. |
| 6,847,686 B2 | 1/2005 | Morad et al. |
| 6,850,693 B2 | 2/2005 | Young et al. |
| 6,865,746 B1 | 3/2005 | Herrington et al. |
| 6,871,146 B1 | 3/2005 | Kelly et al. |
| 6,871,186 B1 | 3/2005 | Tuzhilin et al. |
| 6,882,299 B1 | 4/2005 | Allport |
| 6,898,762 B2 | 5/2005 | Ellis et al. |
| 6,920,281 B1 | 7/2005 | Agnibotri et al. |
| 6,925,035 B2 | 8/2005 | Ueki |
| 6,925,567 B1 | 8/2005 | Hirata |
| 6,927,806 B2 | 8/2005 | Chan |
| 6,934,964 B1 | 8/2005 | Schaffer et al. |
| 6,968,364 B1 * | 11/2005 | Wong et al. ............ 709/217 |
| 6,973,669 B2 | 12/2005 | Daniels |
| 6,985,188 B1 | 1/2006 | Hurst, Jr. |
| 7,006,881 B1 | 2/2006 | Hoffberg et al. |
| 7,013,339 B2 | 3/2006 | Schwager |
| 7,017,118 B1 | 3/2006 | Carroll |
| 7,017,171 B1 | 3/2006 | Horlander et al. |
| 7,017,179 B1 | 3/2006 | Asamoto et al. |
| 7,027,716 B1 | 4/2006 | Boyle et al. |
| 7,058,635 B1 | 6/2006 | Shah-Nazaroff et al. |
| 7,069,576 B1 | 6/2006 | Knudson et al. |
| 7,084,780 B2 | 8/2006 | Nguyen et al. |
| 7,088,910 B2 | 8/2006 | Potrebic et al. |
| 7,096,483 B1 | 8/2006 | Ukai et al. |
| 7,103,339 B2 | 9/2006 | Sternberg |

(56) References Cited

U.S. PATENT DOCUMENTS

| | | |
|---|---|---|
| 7,117,518 B1 | 10/2006 | Takahashi et al. |
| 7,134,131 B1 | 11/2006 | Hendricks et al. |
| 7,143,430 B1 | 11/2006 | Fingerman et al. |
| 7,151,886 B2 | 12/2006 | Young et al. |
| 7,152,236 B1 | 12/2006 | Wugofski et al. |
| 7,165,098 B1 | 1/2007 | Boyer et al. |
| 7,181,128 B1 | 2/2007 | Wada et al. |
| 7,185,355 B1 | 2/2007 | Ellis et al. |
| 7,187,847 B2 | 3/2007 | Young et al. |
| 7,194,755 B1 | 3/2007 | Nakata et al. |
| 7,207,055 B1 | 4/2007 | Hendricks et al. |
| 7,209,640 B2 | 4/2007 | Young et al. |
| 7,218,839 B2 | 5/2007 | Plourde et al. |
| 7,224,886 B2 | 5/2007 | Akamatsu et al. |
| 7,225,142 B1 | 5/2007 | Apte et al. |
| 7,229,012 B1 | 6/2007 | Enright et al. |
| 7,229,354 B2 | 6/2007 | McNutt et al. |
| 7,260,823 B2 | 8/2007 | Schlack et al. |
| 7,328,450 B2 | 2/2008 | Macrae et al. |
| 7,343,614 B1 | 3/2008 | Hendricks et al. |
| 7,356,246 B1 | 4/2008 | Kobb |
| 7,369,749 B2 | 5/2008 | Ichioka et al. |
| 7,369,750 B2 | 5/2008 | Cheng et al. |
| 7,403,935 B2 | 7/2008 | Horvitz et al. |
| 7,437,751 B2 | 10/2008 | Daniels |
| 7,477,832 B2 | 1/2009 | Young et al. |
| 7,480,929 B2 | 1/2009 | Klosterman et al. |
| 7,493,641 B2 | 2/2009 | Klosterman et al. |
| 7,519,268 B2 | 4/2009 | Juen et al. |
| 7,543,321 B2 | 6/2009 | Leftwich |
| 7,546,621 B2 | 6/2009 | LaJoie et al. |
| 7,552,459 B2 | 6/2009 | Klosterman et al. |
| 7,603,685 B2 | 10/2009 | Knudson et al. |
| 7,603,690 B2 | 10/2009 | Knudson et al. |
| 7,665,109 B2 | 2/2010 | Matthews, III et al. |
| 7,689,995 B1 | 3/2010 | Francis et al. |
| 7,748,018 B2 | 6/2010 | Young et al. |
| 7,774,812 B2 | 8/2010 | Knudson et al. |
| 7,778,158 B2 | 8/2010 | Vogel et al. |
| 8,024,763 B2 | 9/2011 | Knudson |
| 8,073,921 B2 | 12/2011 | Thomas et al. |
| 8,132,206 B2 | 3/2012 | Leftwich et al. |
| 8,265,458 B2 | 9/2012 | Helmstetter |
| 8,595,767 B2 | 11/2013 | Knudson et al. |
| 2001/0012439 A1 | 8/2001 | Young et al. |
| 2001/0013122 A1 | 8/2001 | Hirata |
| 2001/0021995 A1* | 9/2001 | Hatano ............... 725/50 |
| 2001/0026533 A1 | 10/2001 | Schwager |
| 2001/0028782 A1 | 10/2001 | Ohno et al. |
| 2001/0034237 A1 | 10/2001 | Garahi |
| 2001/0043795 A1 | 11/2001 | Wood et al. |
| 2002/0009283 A1 | 1/2002 | Ichioka et al. |
| 2002/0026496 A1 | 2/2002 | Boyer et al. |
| 2002/0032907 A1 | 3/2002 | Daniels |
| 2002/0040475 A1 | 4/2002 | Yap et al. |
| 2002/0056098 A1 | 5/2002 | White |
| 2002/0057892 A1 | 5/2002 | Mano et al. |
| 2002/0057893 A1 | 5/2002 | Wood et al. |
| 2002/0059599 A1 | 5/2002 | Schein et al. |
| 2002/0090203 A1 | 7/2002 | Mankovitz |
| 2002/0095673 A1* | 7/2002 | Leung et al. .......... 725/25 |
| 2002/0100044 A1 | 7/2002 | Daniels |
| 2002/0100052 A1 | 7/2002 | Daniels |
| 2002/0112249 A1 | 8/2002 | Hendricks et al. |
| 2002/0118676 A1 | 8/2002 | Tonnby et al. |
| 2002/0129368 A1 | 9/2002 | Schlack et al. |
| 2002/0138840 A1 | 9/2002 | Schein et al. |
| 2002/0144279 A1 | 10/2002 | Zhou |
| 2002/0147977 A1 | 10/2002 | Hammett et al. |
| 2002/0154888 A1 | 10/2002 | Allen et al. |
| 2002/0174430 A1 | 11/2002 | Ellis et al. |
| 2002/0174433 A1 | 11/2002 | Baumgartner et al. |
| 2002/0221310 | 11/2002 | Herrington et al. |
| 2002/0184626 A1 | 12/2002 | Darbee et al. |
| 2002/0186959 A1 | 12/2002 | Young et al. |
| 2002/0191954 A1 | 12/2002 | Beach et al. |
| 2002/0194596 A1 | 12/2002 | Srivastava |
| 2002/0199185 A1 | 12/2002 | Kaminski et al. |
| 2003/0005445 A1* | 1/2003 | Schein et al. ............... 725/51 |
| 2003/0009766 A1 | 1/2003 | Marolda |
| 2003/0012555 A1 | 1/2003 | Yuen et al. |
| 2003/0031465 A1 | 2/2003 | Blake |
| 2003/0037336 A1 | 2/2003 | Leftwich |
| 2003/0040962 A1 | 2/2003 | Lewis |
| 2003/0084461 A1 | 5/2003 | Hoang |
| 2003/0093329 A1 | 5/2003 | Gutta |
| 2003/0097227 A1 | 5/2003 | Bloch et al. |
| 2003/0098891 A1 | 5/2003 | Molander |
| 2003/0103088 A1 | 6/2003 | Dresti et al. |
| 2003/0115602 A1 | 6/2003 | Knee et al. |
| 2003/0118323 A1 | 6/2003 | Ismail et al. |
| 2003/0126607 A1 | 7/2003 | Phillips et al. |
| 2003/0131356 A1 | 7/2003 | Proehl et al. |
| 2003/0135852 A1 | 7/2003 | Kamemoto |
| 2003/0149980 A1 | 8/2003 | Hassell et al. |
| 2003/0149988 A1* | 8/2003 | Ellis et al. ............... 725/87 |
| 2003/0163814 A1* | 8/2003 | Hayakawa ............... 725/45 |
| 2003/0164858 A1 | 9/2003 | Klosterman et al. |
| 2003/0185545 A1 | 10/2003 | Young et al. |
| 2003/0188311 A1 | 10/2003 | Yuen et al. |
| 2003/0196201 A1 | 10/2003 | Schein et al. |
| 2003/0198462 A1 | 10/2003 | Bumgardner et al. |
| 2003/0206719 A1 | 11/2003 | Bumgardner et al. |
| 2003/0208756 A1 | 11/2003 | Macrae et al. |
| 2003/0208758 A1 | 11/2003 | Schein et al. |
| 2003/0210898 A1 | 11/2003 | Juen et al. |
| 2004/0008971 A1 | 1/2004 | Young et al. |
| 2004/0031050 A1 | 2/2004 | Klosterman |
| 2004/0049794 A1 | 3/2004 | Shao et al. |
| 2004/0060063 A1 | 3/2004 | Russ et al. |
| 2004/0078815 A1 | 4/2004 | Lemmons et al. |
| 2004/0098744 A1 | 5/2004 | Gutta |
| 2004/0103434 A1 | 5/2004 | Ellis |
| 2004/0103439 A1 | 5/2004 | Macrae et al. |
| 2004/0107207 A1* | 6/2004 | Kondo et al. .............. 707/102 |
| 2004/0128686 A1 | 7/2004 | Boyer et al. |
| 2004/0139465 A1 | 7/2004 | Matthews, III et al. |
| 2004/0156614 A1 | 8/2004 | Bumgardner et al. |
| 2004/0181814 A1 | 9/2004 | Ellis et al. |
| 2004/0194138 A1 | 9/2004 | Boylan et al. |
| 2004/0210932 A1 | 10/2004 | Mori et al. |
| 2004/0210935 A1 | 10/2004 | Schein et al. |
| 2004/0221310 A1 | 11/2004 | Herrington et al. |
| 2005/0015804 A1 | 1/2005 | LaJoie et al. |
| 2005/0015815 A1 | 1/2005 | Shoff et al. |
| 2005/0028208 A1 | 2/2005 | Ellis et al. |
| 2005/0028218 A1 | 2/2005 | Blake |
| 2005/0044567 A1 | 2/2005 | Young et al. |
| 2005/0138657 A1 | 6/2005 | Leftwich |
| 2005/0138660 A1 | 6/2005 | Boyer et al. |
| 2005/0183123 A1 | 8/2005 | Lee et al. |
| 2005/0193414 A1 | 9/2005 | Horvitz et al. |
| 2005/0204388 A1* | 9/2005 | Knudson et al. ............. 725/58 |
| 2005/0229214 A1 | 10/2005 | Young et al. |
| 2005/0229215 A1 | 10/2005 | Schein et al. |
| 2005/0235320 A1 | 10/2005 | Maze et al. |
| 2005/0235323 A1 | 10/2005 | Ellis et al. |
| 2005/0240962 A1 | 10/2005 | Cooper et al. |
| 2005/0240968 A1 | 10/2005 | Knudson et al. |
| 2005/0251822 A1 | 11/2005 | Knowles et al. |
| 2005/0251827 A1 | 11/2005 | Ellis et al. |
| 2005/0251831 A1 | 11/2005 | Young et al. |
| 2005/0251836 A1 | 11/2005 | Young et al. |
| 2005/0265169 A1 | 12/2005 | Yoshimaru et al. |
| 2005/0273819 A1 | 12/2005 | Knudson et al. |
| 2005/0278741 A1 | 12/2005 | Robarts et al. |
| 2006/0031883 A1 | 2/2006 | Ellis et al. |
| 2006/0083484 A1 | 4/2006 | Wada et al. |
| 2006/0085825 A1 | 4/2006 | Istvan et al. |
| 2006/0136966 A1 | 6/2006 | Folk |
| 2006/0212894 A1 | 9/2006 | Knudson et al. |
| 2007/0157242 A1 | 7/2007 | Cordray et al. |
| 2007/0162937 A1 | 7/2007 | Casement et al. |
| 2007/0204308 A1 | 8/2007 | Nicholas et al. |

(56) References Cited

U.S. PATENT DOCUMENTS

| | | | |
|---|---|---|---|
| 2007/0271582 | A1 | 11/2007 | Ellis et al. |
| 2007/0299685 | A1* | 12/2007 | Marsh ............................. 705/1 |
| 2008/0010655 | A1 | 1/2008 | Ellis et al. |
| 2008/0013429 | A1 | 1/2008 | Chen et al. |
| 2008/0026300 | A1 | 1/2008 | Itoh et al. |
| 2008/0098431 | A1 | 4/2008 | Young et al. |
| 2008/0134239 | A1 | 6/2008 | Knowles et al. |
| 2008/0178221 | A1 | 7/2008 | Schein et al. |
| 2008/0181574 | A1 | 7/2008 | Ellis et al. |
| 2008/0184297 | A1 | 7/2008 | Ellis et al. |
| 2008/0184302 | A1 | 7/2008 | Knudson et al. |
| 2008/0184304 | A1 | 7/2008 | Ellis et al. |
| 2008/0184308 | A1 | 7/2008 | Herrington et al. |
| 2008/0184312 | A1 | 7/2008 | Schein et al. |
| 2008/0184313 | A1 | 7/2008 | Knudson et al. |
| 2008/0184322 | A1 | 7/2008 | Blake |
| 2008/0189742 | A1 | 8/2008 | Ellis et al. |
| 2008/0189743 | A1 | 8/2008 | Ellis et al. |
| 2008/0263600 | A1 | 10/2008 | Olague et al. |
| 2008/0288980 | A1 | 11/2008 | Schein et al. |
| 2009/0044226 | A1 | 2/2009 | Ellis et al. |
| 2009/0070817 | A1 | 3/2009 | Ellis et al. |
| 2009/0241144 | A1 | 9/2009 | LaJoie et al. |
| 2009/0260036 | A1 | 10/2009 | Leftwich |
| 2009/0297124 | A1 | 12/2009 | Ng |
| 2009/0310937 | A1 | 12/2009 | Ellis et al. |
| 2010/0247065 | A1 | 9/2010 | Cooper et al. |
| 2010/0284666 | A1 | 11/2010 | Knudson et al. |
| 2010/0287590 | A1 | 11/2010 | Knudson et al. |
| 2010/0287591 | A1 | 11/2010 | Knudson et al. |
| 2010/0325673 | A1 | 12/2010 | Knudson et al. |
| 2012/0030714 | A1* | 2/2012 | Sweatt et al. .................. 725/54 |

FOREIGN PATENT DOCUMENTS

| | | |
|---|---|---|
| AU | 735093 | 6/2001 |
| AU | 7556701 | 11/2001 |
| AU | 757778 | 3/2003 |
| AU | 2002250350 | 4/2008 |
| AU | 2008201306 | 2/2011 |
| CA | 1217269 | 1/1987 |
| CA | 2091160 | 3/1992 |
| CA | 2284587 | 3/1992 |
| CA | 2420426 | 3/1992 |
| CA | 2499751 | 3/1992 |
| CA | 2499757 | 3/1992 |
| CA | 2499761 | 3/1992 |
| CA | 2499765 | 3/1992 |
| CA | 2553384 | 3/1992 |
| CA | 2553385 | 3/1992 |
| CA | 2 304 221 | 4/1999 |
| CA | 2 554 487 | 4/1999 |
| CA | 2232003 | 6/2002 |
| CN | 1066355 | 11/1992 |
| CN | 1066356 | 11/1992 |
| CN | 1066357 | 11/1992 |
| CN | 1067147 | 12/1992 |
| CN | 1567986 | 1/2005 |
| CN | 100350798 | 11/2007 |
| DE | 2333116 | 1/1975 |
| DE | 2445520 | 4/1976 |
| DE | 2612260 | 9/1977 |
| DE | 2918846 | 11/1980 |
| DE | 31 51 492 A1 | 7/1983 |
| DE | 3328001 | 2/1985 |
| DE | 3337204 | 4/1985 |
| DE | 35 27 939 | 2/1987 |
| DE | 3621263 | 1/1988 |
| DE | 3623924 | 2/1988 |
| DE | 3640436 | 6/1988 |
| DE | 3921847 | 1/1991 |
| DE | 4201031 | 7/1993 |
| DE | 4217246 | 12/1993 |
| DE | 4240187 | 6/1994 |
| DE | 4407701 | 9/1995 |
| DE | 4431438 | 3/1996 |
| DE | 44 40 174 | 5/1996 |
| DE | 19502922 | 8/1996 |
| DE | 195 31 121 | 2/1997 |
| DE | 19531121 | 2/1997 |
| DE | 197 40 079 | 3/1999 |
| DE | 697 18 162 | 10/2003 |
| EP | 0 723 369 | 8/1942 |
| EP | 0 051 228 | 5/1982 |
| EP | 0112589 | 7/1984 |
| EP | 0122626 | 10/1984 |
| EP | 0133985 | 3/1985 |
| EP | 0191149 | 8/1986 |
| EP | 0 256 295 | 2/1988 |
| EP | 0254927 | 2/1988 |
| EP | 0 276 425 | 8/1988 |
| EP | 0 300 562 | 1/1989 |
| EP | 0337336 | 10/1989 |
| EP | 0363653 | 4/1990 |
| EP | 393955 | 10/1990 |
| EP | 0 447 968 | 9/1991 |
| EP | 0444496 | 9/1991 |
| EP | 0 472 147 | 2/1992 |
| EP | 0488379 | 6/1992 |
| EP | 0 548 286 | 6/1993 |
| EP | 0 560 593 | 9/1993 |
| EP | 0 572 090 | 12/1993 |
| EP | 0 617 563 | 9/1994 |
| EP | 0 624 040 | 11/1994 |
| EP | 0 662 769 | 7/1995 |
| EP | 0 682 452 | 11/1995 |
| EP | 0 721 253 | 7/1996 |
| EP | 0 725 539 | 8/1996 |
| EP | 0 439 281 | 9/1996 |
| EP | 0 742 669 | 11/1996 |
| EP | 0 753 964 | 1/1997 |
| EP | 0 762 756 | 3/1997 |
| EP | 0 774 853 A2 | 5/1997 |
| EP | 0 774 866 | 5/1997 |
| EP | 0 789 488 | 8/1997 |
| EP | 0 793 225 A2 | 9/1997 |
| EP | 0 795 994 | 9/1997 |
| EP | 0 797 355 | 9/1997 |
| EP | 0 805 594 | 11/1997 |
| EP | 0 801 367 | 12/1997 |
| EP | 0 836 320 | 4/1998 |
| EP | 0 836 321 | 4/1998 |
| EP | 0 837 599 | 4/1998 |
| EP | 0 843 468 | 5/1998 |
| EP | 0 852 361 | 7/1998 |
| EP | 0 854 645 | 7/1998 |
| EP | 0 856 847 | 8/1998 |
| EP | 0 858 223 | 12/1998 |
| EP | 0 921 682 | 6/1999 |
| EP | 0 924 927 | 6/1999 |
| EP | 0 940 983 | 9/1999 |
| EP | 0 940 985 | 9/1999 |
| EP | 0 944 253 | 9/1999 |
| EP | 0 945 003 | 9/1999 |
| EP | 0 969 662 | 1/2000 |
| EP | 1 014 715 | 6/2000 |
| EP | 1 059 749 | 12/2000 |
| EP | 1 099 339 | 5/2001 |
| EP | 0632949 | 5/2001 |
| EP | 1 111 912 | 6/2001 |
| EP | 1 126 700 | 8/2001 |
| EP | 1 228 643 | 8/2002 |
| EP | 1 244 300 | 9/2002 |
| EP | 1 271 952 | 1/2003 |
| EP | 1 337 108 | 8/2003 |
| EP | 1 377 049 | 1/2004 |
| EP | 1 515 549 | 3/2005 |
| EP | 1 538 838 | 6/2005 |
| EP | 1 613 066 | 6/2007 |
| FR | 2 572 235 | 4/1986 |
| FR | 2 579 397 | 9/1986 |
| GB | 1 370 535 | 10/1974 |
| GB | 1554411 | 10/1979 |

(56) References Cited

FOREIGN PATENT DOCUMENTS

| | | |
|---|---|---|
| GB | 2034995 | 6/1980 |
| GB | 2 062 424 | 5/1981 |
| GB | 2126002 | 3/1984 |
| GB | 2155713 A | 9/1985 |
| GB | 2 185 670 | 7/1987 |
| GB | 2191643 | 12/1987 |
| GB | 2210526 | 6/1989 |
| GB | 2215928 | 9/1989 |
| GB | 22 17144 | 10/1989 |
| GB | 2 227 622 | 8/1990 |
| GB | 2 229 595 | 9/1990 |
| GB | 2256115 | 11/1992 |
| GB | 2256546 | 12/1992 |
| GB | 2265792 | 10/1993 |
| GB | 2275800 | 9/1994 |
| GB | 2 286 754 | 8/1995 |
| GB | 2 346 251 | 8/2000 |
| HK | 1063124 | 3/2007 |
| JP | 58-210776 | 12/1983 |
| JP | 60-61935 | 4/1985 |
| JP | 60-069850 | 4/1985 |
| JP | 60-171685 | 9/1985 |
| JP | 61-109379 | 5/1986 |
| JP | 63-59075 | 8/1986 |
| JP | 61-227486 | 10/1986 |
| JP | 62-008389 | 1/1987 |
| JP | 62-49528 | 3/1987 |
| JP | 62-60377 | 3/1987 |
| JP | 62-60384 | 3/1987 |
| JP | 62-066493 | 3/1987 |
| JP | 62-082325 | 4/1987 |
| JP | 62-125077 | 6/1987 |
| JP | 62-198768 | 9/1987 |
| JP | 62-198768 | 12/1987 |
| JP | 63-23690 | 2/1988 |
| JP | 63-054830 | 3/1988 |
| JP | 63-54884 | 3/1988 |
| JP | 63-059075 | 3/1988 |
| JP | 63-092177 | 4/1988 |
| JP | 63-113662 | 5/1988 |
| JP | 63-113663 | 5/1988 |
| JP | 63-124293 | 5/1988 |
| JP | 63-141467 | 6/1988 |
| JP | 63-247812 | 10/1988 |
| JP | 63276069 | 11/1988 |
| JP | 63-299582 | 12/1988 |
| JP | 64-013278 | 1/1989 |
| JP | 1-078328 | 3/1989 |
| JP | 1-78328 | 5/1989 |
| JP | 1-120978 | 5/1989 |
| JP | 1-166678 | 6/1989 |
| JP | 01142918 | 6/1989 |
| JP | 01150928 | 6/1989 |
| JP | 1-184691 | 7/1989 |
| JP | 1-209399 | 8/1989 |
| JP | 1-212986 | 8/1989 |
| JP | 01-213853 | 8/1989 |
| JP | 1-306962 | 12/1989 |
| JP | 1-307944 | 12/1989 |
| JP | 2838892 | 12/1989 |
| JP | 2-056791 | 2/1990 |
| JP | 2-45495 | 3/1990 |
| JP | 2-081385 | 3/1990 |
| JP | 2113318 | 4/1990 |
| JP | 2-117288 | 5/1990 |
| JP | 2-146884 | 6/1990 |
| JP | 2-189753 | 7/1990 |
| JP | 60-171685 | 7/1990 |
| JP | 2-288571 | 11/1990 |
| JP | 3-22770 | 1/1991 |
| JP | 3-35451 | 2/1991 |
| JP | 03-059837 | 3/1991 |
| JP | 3-215781 | 9/1991 |
| JP | 04-079053 | 3/1992 |
| JP | 04-127688 | 4/1992 |
| JP | 04-227380 | 8/1992 |
| JP | 04-250760 | 9/1992 |
| JP | 5-53378 | 3/1993 |
| JP | 5-260400 | 10/1993 |
| JP | 05-266854 | 10/1993 |
| JP | 6-014129 | 1/1994 |
| JP | 06-021907 | 1/1994 |
| JP | 6-046345 | 2/1994 |
| JP | O6-038165 | 2/1994 |
| JP | 6061935 | 3/1994 |
| JP | 6-111413 | 4/1994 |
| JP | 06-153109 | 5/1994 |
| JP | 06-504165 | 5/1994 |
| JP | 06-243539 | 9/1994 |
| JP | 6-261139 | 9/1994 |
| JP | 6-303541 | 10/1994 |
| JP | 07-20254 | 1/1995 |
| JP | 07-123326 | 5/1995 |
| JP | 07-135621 | 5/1995 |
| JP | 07-147657 | 6/1995 |
| JP | 7-154349 | 6/1995 |
| JP | 07-160732 | 6/1995 |
| JP | 7-184131 | 7/1995 |
| JP | 07-193762 | 7/1995 |
| JP | 7-212331 | 8/1995 |
| JP | 7-212732 | 8/1995 |
| JP | 07-297796 | 11/1995 |
| JP | 08-032528 | 2/1996 |
| JP | 08-032538 | 2/1996 |
| JP | 8-56352 | 2/1996 |
| JP | 08-125497 | 5/1996 |
| JP | 08-506941 | 7/1996 |
| JP | 8-242313 | 9/1996 |
| JP | 08-242436 | 9/1996 |
| JP | 08-251122 | 9/1996 |
| JP | 08-275077 | 10/1996 |
| JP | 08-289218 | 11/1996 |
| JP | 08-289219 | 11/1996 |
| JP | 08-289281 | 11/1996 |
| JP | 09-37168 | 2/1997 |
| JP | 9-65300 | 3/1997 |
| JP | 9-97295 | 4/1997 |
| JP | 9-102827 | 4/1997 |
| JP | 9-120686 | 5/1997 |
| JP | 9-148994 | 6/1997 |
| JP | 9-162818 | 6/1997 |
| JP | 09-245463 | 9/1997 |
| JP | 9-270965 | 10/1997 |
| JP | 9-289630 | 11/1997 |
| JP | 9-298677 | 11/1997 |
| JP | 10-93905 | 4/1998 |
| JP | 63-174484 | 7/1998 |
| JP | 10-228500 | 8/1998 |
| JP | 10-234007 | 9/1998 |
| JP | 10-257400 | 9/1998 |
| JP | 10247344 | 9/1998 |
| JP | 11-136615 | 5/1999 |
| JP | 11-136658 | 5/1999 |
| JP | 11-177919 | 7/1999 |
| JP | 11-177962 | 7/1999 |
| JP | 11-261917 | 9/1999 |
| JP | 11-308561 | 11/1999 |
| JP | 11-313280 | 11/1999 |
| JP | 11-317937 | 11/1999 |
| JP | 2000-13708 | 1/2000 |
| JP | 2000-138886 | 5/2000 |
| JP | 2000-224533 | 8/2000 |
| JP | 2000-235546 | 8/2000 |
| JP | 2000-261750 | 9/2000 |
| JP | 2000-287179 | 10/2000 |
| JP | 3098215 | 10/2000 |
| JP | 2000-306314 | 11/2000 |
| JP | 2000-312333 | 11/2000 |
| JP | 2000-339931 | 12/2000 |
| JP | 2001-022282 | 1/2001 |
| JP | 2001-086423 | 3/2001 |
| JP | 2001-88372 | 4/2001 |
| JP | 2001-165669 | 6/2001 |
| JP | 2001-167522 | 6/2001 |

(56) References Cited

FOREIGN PATENT DOCUMENTS

| | | |
|---|---|---|
| JP | 2001-257950 | 9/2001 |
| JP | 2003-199004 | 7/2003 |
| JP | 2004-007592 | 1/2004 |
| JP | 2004-023326 | 1/2004 |
| JP | 3600149 | 12/2004 |
| JP | 3832805 | 7/2006 |
| JP | 3968067 | 8/2007 |
| JP | 3971439 | 9/2007 |
| JP | 4020405 | 12/2007 |
| JP | 4023814 | 12/2007 |
| JP | 4085115 | 2/2008 |
| JP | 4054827 | 3/2008 |
| JP | 4054828 | 3/2008 |
| JP | 4518774 | 5/2010 |
| JP | 4610852 | 1/2011 |
| KR | 1998/025758 | 7/1998 |
| KR | 10-0856768 | 8/2008 |
| KR | 10-0896725 | 4/2009 |
| KR | 10-0896729 | 4/2009 |
| KR | 10-0996475 | 11/2010 |
| TW | 247388 | 10/1994 |
| WO | WO 86/01359 | 2/1986 |
| WO | WO 87/00884 | 2/1987 |
| WO | WO 87/03766 | 6/1987 |
| WO | WO 88/04507 | 6/1988 |
| WO | WO 89/03085 | 4/1989 |
| WO | WO 90/15507 | 6/1989 |
| WO | WO 90/00847 | 1/1990 |
| WO | WO 90/00084 | 7/1990 |
| WO | WO 90/07844 | 7/1990 |
| WO | WO 91/07050 | 5/1991 |
| WO | WO 91/08629 | 6/1991 |
| WO | WO 92/08320 | 5/1992 |
| WO | WO 92-17027 | 10/1992 |
| WO | WO 92/22983 | 12/1992 |
| WO | WO 93/07711 | 4/1993 |
| WO | WO 93/23957 | 11/1993 |
| WO | WO 93/26121 | 12/1993 |
| WO | WO 94/13107 | 6/1994 |
| WO | WO 94/14281 | 6/1994 |
| WO | WO 94/14282 | 6/1994 |
| WO | WO 94/14283 | 6/1994 |
| WO | WO 94/14284 | 6/1994 |
| WO | WO 94/15284 | 7/1994 |
| WO | WO 95-01056 | 1/1995 |
| WO | WO 95-01058 | 1/1995 |
| WO | WO 95-01059 | 1/1995 |
| WO | WO 95/04431 | 2/1995 |
| WO | WO 95/06389 | 3/1995 |
| WO | WO 95-10910 | 4/1995 |
| WO | WO 95/15657 | 6/1995 |
| WO | WO 95/19092 | 7/1995 |
| WO | WO 95/26608 | 10/1995 |
| WO | WO 95-28055 | 10/1995 |
| WO | WO 95/28799 | 10/1995 |
| WO | WO 95-30961 | 11/1995 |
| WO | WO 95/32583 | 11/1995 |
| WO | WO 95/32585 | 11/1995 |
| WO | WO 95-32587 | 11/1995 |
| WO | WO 96-07270 | 3/1996 |
| WO | WO 96/08927 | 3/1996 |
| WO | WO 96-09721 | 3/1996 |
| WO | WO 96/13013 | 5/1996 |
| WO | WO 96/13124 | 5/1996 |
| WO | WO 96/13932 | 5/1996 |
| WO | WO 96/17467 | 6/1996 |
| WO | WO 96/17473 | 6/1996 |
| WO | WO 96-20555 | 7/1996 |
| WO | WO 96-21990 | 7/1996 |
| WO | WO 96-26605 | 8/1996 |
| WO | WO 96/27989 | 9/1996 |
| WO | WO 96/31980 | 10/1996 |
| WO | WO 96/34486 | 10/1996 |
| WO | WO 96-34491 | 10/1996 |
| WO | WO 96-36172 | 11/1996 |
| WO | WO 96-37075 | 11/1996 |
| WO | WO 96/37996 | 11/1996 |
| WO | WO 96-38799 | 12/1996 |
| WO | WO 96/38962 | 12/1996 |
| WO | WO 96/41470 | 12/1996 |
| WO | WO 96/41471 | 12/1996 |
| WO | WO 96/41477 | 12/1996 |
| WO | WO 96/41478 | 12/1996 |
| WO | WO 97/12486 | 4/1997 |
| WO | WO 97/13368 | 4/1997 |
| WO | WO 97-19565 | 5/1997 |
| WO | WO 97/22207 | 6/1997 |
| WO | WO 97/31480 | 8/1997 |
| WO | WO 97/33434 | 9/1997 |
| WO | WO 97-34413 | 9/1997 |
| WO | WO 97/35428 | 9/1997 |
| WO | WO 97/36422 | 10/1997 |
| WO | WO 97/40623 | 10/1997 |
| WO | WO 97/42763 | 11/1997 |
| WO | WO 97/45786 | 12/1997 |
| WO | WO 97-46943 | 12/1997 |
| WO | WO 97-47106 | 12/1997 |
| WO | WO 97-47124 | 12/1997 |
| WO | WO 97-47143 | 12/1997 |
| WO | WO 97/48230 | 12/1997 |
| WO | WO 97-49237 | 12/1997 |
| WO | WO 97-49242 | 12/1997 |
| WO | WO 97-50251 | 12/1997 |
| WO | WO 98/06219 | 2/1998 |
| WO | WO 98/07277 | 2/1998 |
| WO | WO 98-10589 | 3/1998 |
| WO | WO 98/10598 | 3/1998 |
| WO | WO 98-10598 | 3/1998 |
| WO | WO 98/13932 | 4/1998 |
| WO | WO 98/14009 | 4/1998 |
| WO | WO 98/16062 | 4/1998 |
| WO | WO 98/17063 | 4/1998 |
| WO | WO 98-17064 | 4/1998 |
| WO | WO 98/21664 | 5/1998 |
| WO | WO 98/21877 | 5/1998 |
| WO | WO 98-26584 | 6/1998 |
| WO | WO 98/28906 | 7/1998 |
| WO | WO 98-43183 | 10/1998 |
| WO | WO 98/47283 | 10/1998 |
| WO | WO 98/47290 | 10/1998 |
| WO | WO 98/48566 | 10/1998 |
| WO | WO 98-56173 | 12/1998 |
| WO | WO 98-56176 | 12/1998 |
| WO | WO 99/01984 | 1/1999 |
| WO | WO 99-03267 | 1/1999 |
| WO | WO 99/04561 | 1/1999 |
| WO | WO 99-04570 | 1/1999 |
| WO | WO 99-14947 | 3/1999 |
| WO | WO 99/18721 | 4/1999 |
| WO | WO 99/81721 | 4/1999 |
| WO | WO 99-30491 | 6/1999 |
| WO | WO 99/35827 | 7/1999 |
| WO | WO 99/37045 | 7/1999 |
| WO | WO 99-45700 | 9/1999 |
| WO | WO 99/45701 | 9/1999 |
| WO | WO 99-52279 | 10/1999 |
| WO | WO 99/56473 | 11/1999 |
| WO | WO 99/57837 | 11/1999 |
| WO | WO 99-57839 | 11/1999 |
| WO | WO 99/60493 | 11/1999 |
| WO | WO 99-60783 | 11/1999 |
| WO | WO 99/60790 | 11/1999 |
| WO | WO 99/65237 | 12/1999 |
| WO | WO 99/65242 | 12/1999 |
| WO | WO 99-66725 | 12/1999 |
| WO | WO 00-04706 | 1/2000 |
| WO | WO 00-04707 | 1/2000 |
| WO | WO 00/04708 | 1/2000 |
| WO | WO 00/04709 | 1/2000 |
| WO | WO 00/05889 | 2/2000 |
| WO | WO 00-07368 | 2/2000 |
| WO | WO 00-08850 | 2/2000 |
| WO | WO 00-08851 | 2/2000 |
| WO | WO 00-08852 | 2/2000 |

(56) References Cited

FOREIGN PATENT DOCUMENTS

| | | |
|---|---|---|
| WO | WO 00/11869 | 3/2000 |
| WO | WO 00/13416 | 3/2000 |
| WO | WO 00/16336 | 3/2000 |
| WO | WO 00-16548 | 3/2000 |
| WO | WO 00/28379 | 5/2000 |
| WO | WO 00/28734 | 5/2000 |
| WO | WO 00-28739 | 5/2000 |
| WO | WO 00/40014 | 7/2000 |
| WO | WO 00-58833 | 10/2000 |
| WO | WO 00-58967 | 10/2000 |
| WO | WO 00-59214 | 10/2000 |
| WO | WO 00-59233 | 10/2000 |
| WO | WO 00-62298 | 10/2000 |
| WO | WO 00-62299 | 10/2000 |
| WO | WO 00-62533 | 10/2000 |
| WO | WO 00-67475 | 11/2000 |
| WO | WO 00/79798 | 12/2000 |
| WO | WO 01/10128 | 2/2001 |
| WO | WO 01/11865 | 2/2001 |
| WO | WO 01-22729 | 3/2001 |
| WO | WO 01/35662 | 5/2001 |
| WO | WO 01-46843 | 6/2001 |
| WO | WO 01-47238 | 6/2001 |
| WO | WO 01-47249 | 6/2001 |
| WO | WO 01-47257 | 6/2001 |
| WO | WO 01-47273 | 6/2001 |
| WO | WO 01-47279 | 6/2001 |
| WO | WO 01-76239 | 10/2001 |
| WO | WO 01-76248 | 10/2001 |
| WO | WO 01/76704 | 10/2001 |
| WO | WO 02/03682 | 1/2002 |
| WO | WO 01/47273 | 6/2002 |
| WO | WO 02/069636 | 9/2002 |
| WO | WO 02-078317 | 10/2002 |
| WO | WO 03/005712 | 1/2003 |
| WO | WO 03-098932 | 11/2003 |
| WO | WO 2004-054264 | 6/2004 |
| WO | WO 2005-091626 | 9/2005 |

OTHER PUBLICATIONS

Rundfunktech. Mitteilungen, Jahrg. 26(1982), H. 3, pp. 133-138; Gunter Kroll: Mikroprozessoren in der Fernsehempfagertechnik.
Board of Appeals of the European Patent Office, Entscheidung vom 16. Oct. 1992 for appeal of European Patent EP 0254927.
James, A., "Oracle-Broadcasting the Written Word," Wireless World, Jul. 1973.
Edwardson et al., "CEEFAX: A Proposed New Broadcasting Service," SMPTE Journal, Jan. 1974, vol. 83, pp. 14-19.
Edmondson et al., "NBC Switching Central," SMPTE Journal, Oct. 1976, vol. 85, No. 10, pp. 795-805.
Roizen, Joseph, "Teletext in USA," Jul. 1981, pp. 602-610.
Hoffman et al., "Videotext Programmiert Videorecorder," Sep. 1982, 9 pages.
Printed materials on "Time's Teletext Service," 1982-1983, pp. V79175, V79142, V79143, V79148, and V79151.
Symposium Record Broadcast Sessions, 14$^{th}$ International TV Symposium, Montreux, Switzerland, Jun. 6-12, 1985, 9 pages.
Von Gerhard Eitz and Karl-Ulrich Oberlies, "Videotext Programmiert Videoheimgerate (VPV)," Sep. 1986, pp. 223-229; Translation of Eitz and Oberlies Article, 10 pages.
Kruger, H. Eckart, "Digital Video Identification System VIS," German, 9 pages; Translation, 31 pages.
Ziesel et al., "An Interactive Menu-Driven Remote Control Unit for TV-Receivers and VC-Recorders," IEEE Transactions on Consumer Electronics, Aug. 1988, vol. 34, No. 3, pp. 814-818.
Philips Consumer Electronics, Users Manual.
Philips Consumer Electronics, Users Manual, MatchLine 28DC2070, 33DC2080.
Page 12 of Phillips TV 21SL5756/00B User Manual.
TV Guide, San Francisco Metropolitan Schedule, Feb. 6, 1989.
Systems as described in DIP II ad.
System as described in Cable Data ad. "There's more to one-way addressability than meets the eye," Apr. 5, 1982.
"Digital Video Broadcasting (DVB); DVB specification for data broadcasting", European Telecommunications Standards Institute, Draft EN 301 192 V1.2.1. (Feb. 1999).
"A New Face for Spreadsheets." PC Magazine, Dec. 22, 1987.
"Advanced Analog Systems—Addressable Terminals" General Instrument Corp. of Horsham, Pennsylvania (URL:http--www.gi.com-BUSAREA-ANALOG-TERMINALNVATCH-watch.html) Printed from the Internet on Mar. 4, 1999.
DirecTv Digital Satellite Receiver—Operating Instructions,' Sony Electronics Inc. (2001).
"DirecTv Receiver—Owner's Manual," DirecTV, Inc. (2002).
"DirecTV Receiver with TiVo Digital Satellite Receiver-Recorder SAT-T60—Installation Guide," Sony Corporation (2000).
"DirecTV Receiver with TiVo Installation Guide," Philips (2000).
"DirecTV Receiver with TiVo Viewer's Guide" (1999, 2000).
"DishPro Satellite System—Users Guide," Dish Network (undated).
"Electronic Programme Guide (EPG); Protocol for a TV Guide using electronic data transmission" by European Telecommunication Standards Institute, May 1997, Valbonne, France, publication No. ETS 300 707.
"Expert Report of Dr. Gary S. Tjaden," Dec. 18, 2002.
"Expert Report of Dr. Gary S. Tjaden," May 13, 2002.
"Expert Report of Stephen D. Bristow with regard to validity of U.S. Patent Nos. 5,568,272 and 5,508,815," Jun. 10, 2002.
"Fall 2001 TiVo Service Update with Dual Tuner!," TiVo Inc. (2001).
"Honey, is there anything good on the remote tonight?", advertisement from Multichannel News, Broadband Week Section, p. 168, Nov. 30, 1998.
"How Evolve Works," from the Internet at http://www.evolveproducts.com/network.html, printed on Dec. 28, 1998.
"Jini™ Architecture Overview," by Jim Waldo, from the Internet at http://Java.sun.com/products/jini/whitepapers/architectureoverview.pdf/ printed on Jan. 25, 1999. The document bears a copyright date of 1998.
"PTV Recorder Setup Guide," Philips (2000).
"Reaching your subscribers is a complex and costly process-until now," from the Internet at http://www.evolveproducts.com/info.html, printed on Dec. 28, 1998.
"Start Here," Sony, TiVo and DirecTV (undated).
"Sun's Next Steps in Digital Set-Tops," article in Cablevision, p. 56, Nov. 16, 1998.
"Technology: Turn on, tune in and print out—An experimental interactive television service is set to alter our viewing habits", Financial Times (London), Oct. 14, 1993, p. 11.
"The Evolve EZ Guide. The Remote. Control," from the Internet at http://www.evolveproducts.com/display2.html, printed on Dec. 28, 1998.
"Using StarSight 2," published before Apr. 19, 1995.
"What is Jini?", from the Internet at http://java.sun.com/products/jini/whitepapers/whatsjini.pdf, printed on Jan. 25, 1999.
"Why Jini Now?", from the internet at http://java.sun.com/products/jini/whitepapers/whyjininow.pdf, printed on Jan. 25, 1999. The document bears a copyright date of 1998.
"Windows 98 Feature Combines TV, Terminal and the Internet," New York Times, Aug. 18, 1998.
Archived Intel Intercast's Website from Archieve. Org, "How Does It Work?", <http:--web.archive.org-web-19990429214537-www.intercast.com-intercast-howitwks.htm>, Accessed on Jul. 8, 2008.
Archived Intel Intercast's Website from Archieve. Org, "What is It?", <http:--web.archive.org-web-19990422195517-www.intercast.com-intercast-whatisit.htm>, Accessed on Jul. 8, 2008.
Brugliera, V., "Digital On-Screen Display: A New Technology for the Consumer Interface", Symposium Record: Cable TV Sessions, 18$^{th}$ International Television Symposium and Technical Exhibition, Jun. 1993, pp. 571-586.
Cox, J., et al., "Extended Services in a Digital Compression System", *Proceedings From Eleven Technical Sessions: 42nd Annual Convention and Exposition of the National Cable Television Association*, Jun. 1993, pp. 185-191.
Decision of Technical Board of Appeal 3, 4, 2, Jul. 13, 2004.

(56) References Cited

OTHER PUBLICATIONS

Decisions of the Enlarged Board of Appeal Official Journal EPO, May 31, 2001.
Digital Video Broadcasting (DVB); DVB specification for data broadcasting, European Telecommunications Standards Institute, Draft EN 301 192 V1.2.1 (Jan. 1999).
DiRosa, S. "Pinochle's Bigsurf Netguide", Jul. 1995, vol. 3.1, pp. 260-270.
Eitz, Gerhard, "Zukonftige Informations—Und Datenangebote Beim Digitalen Fernsehen—EPG Und "Lesezeichen"," Rundfunktechnische Mitteilungen, vol. 41, pp. 67-72, Jun. 1997.
Hofmann, Neumann, Oberlies, and Schadwinkel, "Videotext Programmiert Videorecorder," Rundfunktechnische Mitteilungen, Nov.-Dec. 1982, pp. 254-257.
Markowitz, A., "Companies Jump on Interactive Bandwagon", *Discount Store News*, Dec. 6, 1993, pp. 4 and 131.
Neumann, Andreas, "WDR Online Aufbau Und Perspektiven Automatisierter OnlineDienste Im WDR," Rundfunktechnische Mitteilungen, vol. 41, pp. 56-66, Jun. 1997.
Rewind, replay and unwind with new high-tech TV devices, by Lawrence J. Magid, LA Times. This document was printed from the Internet on Jun. 6, 1999 and bears a date of May 19, 1999.
Rogers, Curt. "Telcos vs. Cable TV: The Global View," Data Communications, No. 13, New York, pp. 75, 76, 78 and 80, Sep. 1995.
Sussman, A., "GTE Tunes in to Home TV Shopping", PC Week, Jun. 28, 1988, p. C15.
Users Guide RCA Color TV with TV Plus + Guide, 1997.
Venditto, Gus, "Prodigy for Dummies," 1995, IDG Books, pp. 57-63 and p. 213.
Office Actions and Replies from U.S. Appl. No. 10/927,582.
Office Actions and Replies from U.S. Appl. No. 11/894,741.
Office Actions and Replies from U.S. Appl. No. 10/304,634.
Office Actions and Replies from U.S. Appl. No. 11/182,081.
Office Actions and Replies from U.S. Appl. No. 11/179,410.
Office Actions and Replies from U.S. Appl. No. 09/354,344.
Office Actions and Replies from U.S. Appl. No. 11/246,392.
U.S. Appl. No. 11/820,587.
U.S. Appl. No. 11/894,800.
Office Actions and Replies from U.S. Appl. No. 11/894,646.
Office Actions and Replies from U.S. Appl. No. 10/927,814.
Sanyo Technical Review No. 44, vol. 22, No. 1, Feb. 1990.
Mr. Hallenbeck's Witness Statement 1, dated Feb. 3, 2009.
Mr. Hallenbeck's Witness Statement 2, dated Feb. 13, 2009.
Mr. Hallenbeck's Witness Statement 3, dated May 6, 2009.
Mr. Hallenbeck's Witness Statement 4, dated May 11, 2009.
Mr. Hallenbeck's Witness Statements Exhibit PDH 1 "Triple D, Inc." Publishers of STV "Magazine, OnSat and Satellite Retailer", May 10, 1985.
Mr. Hallenbeck's Witness Statements Exhibit PDH 2 "SuperGuide" "The Programming Guide".
Mr. Hallenbeck's Witness Statements Exhibit PDH 3 "OnSat" Canada's Weekly Guide to Satellite TV pp. 1-18, Nov. 15-21, 1987.
Mr. Hallenbeck's Witness Statements Exhibit PDH 4 "STV a Revolutionary Product 'Electronic Publishing Comes of Age'" by John Gurney, May 1987.
Mr. Hallenbeck's Witness Statements Exhibit PDH 5 "Come Join Us at the Largest and Most Spectacular Satellite TVRO Show in the World! Space/STTI Las Vegas Show '86" 'Las Vegas Convention Center, Las Vegas Nevada' Feb. 19-21, 1986.
Mr. Hallenbeck's Witness Statements Exhibit PDH 6 "Space/STTI Nashville Show 'The Nashville Show Agenda'", Sep. 1-3, 1986 pp. 1-22.
Mr. Hallenbeck's Witness Statements Exhibit PDH 7 "Satellite Television Technology International 'SBCA/STTI Present Nashville!'" Brochure, Jul. 9-11, 1990, vol. 2, 1998, pp. 1-36.
Mr. Hallenbeck's Witness Statements Exhibit PDH 9 "OnSat" America's Weekly Guide to Satellite TV pp. 1-3, Jun. 10-16, 1990.
Mr. Hallenbeck's Witness Statements Exhibit PDH 10 Hallenbeck et al. "Personal Home TV Programming Guide" 1990 IEEE pp. 102.

Mr. Hallenbeck's Witness Statements Exhibit PDH 11 "Mock up of Hallenbeck's "hack" grid display" (undated).
Final ("re-amended") version of the Grounds of Invalidity served by Virgin Media dated May 13, 2009.
Hallenbeck's Cross Examination Transcript Day 7, between Gemstar-TV Guide International Inc. et al and Virgin Media Limited et al. dated Jun. 19, 2009.
Hallenbeck's Cross Examination Transcript Day 8, between Gemstar-TV Guide International Inc. et al and Virgin Media Limited et al. dated Jun. 23, 2009.
IBM Technical Disclosure Bulletin on "Combined-User Interface for Computers, Television, Video Records, and Telephone, etc." vol. 33 No. 3B pp. 1-4, Aug. 1990.
Daily Variety Article "Replay to bow 'instant VCR' New digital TV recorder due in Nov. from Replay" by Paul Karon, published on Sep. 8, 1998.
The past and future prosecution history of U.S. Appl. No. 10/961,008, filed Oct. 7, 2004, including all future Office Actions, Replies and other substantive correspondence.
The prosecution history of U.S. Patent 5,479,266, issued Dec. 26, 1995, including all Office Actions, Replies, and other substantive correspondence.
Japanese Office Action dated Sep. 7, 2009, Serial No. 2006-141978.
Office Actions, Corresponding Replies and Notice of Allowance in relation to U.S. Patent No. 6,357,043 issued Mar. 12, 2002 (UV-140 CONT. 3).
"RCA Satellite Receiver User's Guide," Thomson Multimedia Inc. (2001).
CNN Tech: Sonicblue revives ReplayTV, articles cnn.com, Sep. 10, 2001, retrieved from the internet http://articles.cnn.com/2001-09-10/tech/replay.tv.idg_1_replaytv-sonicblue-digital-video?_s=PM:TECH.
SONICblue Incorporated: ReplayTV 4000 User Guide 12.17, Chapter Five: Networking, Sep. 10, 2001; retrieved from the internet: http://www.digitalnetworksna.com/support/replaytv/dowloads/ReplayTV4000UserGuide.12.17.pdf.
PCT Search Report for PCT/US98/07567 dated Oct. 6, 1998.
Office Actions mailed May 19, 2005, Jun. 15, 2004, Mar. 11, 2003, Jun. 19, 2002, Dec. 18, 2001, May 23, 2001, Feb. 1, 2001, Nov. 3, 2000, and Feb. 17, 2000; and Replies filed Aug. 4, 2003, Jun. 16, 2003, Dec. 27, 2002, Mar. 28, 2002, Mar. 2, 2001, Jan. 9, 2001, and Aug. 21, 2000 in U.S. Appl. No. 09/060,343, filed Apr. 14, 1998 (now abandoned).
Office Actions mailed Dec. 30, 2008, Sep. 18, 2008, Dec. 19, 2007, Aug. 15, 2007, Jan. 29, 2007, and Oct. 24, 2006; and Replies filed Dec. 3, 2008, Jun. 18, 2008, Oct. 31, 2007, May 25, 2007, and Feb. 24, 2005 in U.S. Appl. No. 10/967,672, filed Oct. 15, 2004 (now U.S. Patent 7,543,321 issued Jun. 2, 2009).
Office Actions mailed Mar. 1, 2011 and Nov. 16, 2010; and Replies filed Feb. 16, 2011, Jun. 30, 2009, and Mar. 25, 2009 in U.S. Appl. No. 12/411,208, filed Mar. 25, 2009 (currently pending).
Wahren, Reinhard "Der counter lauft: Interaktives Fernsehen," RFE, pp. 14-16 (Feb. 1994) (Englishe Translation attached).
"Internet Access: Disc Distributing Announces Interactive World Wide" Cambridge Work-Group Computing Report, Cambridge Publishing, Inc., bearing a copyright date of Nov. 13, 1995, http://www.elibrary.com/id/101/101/getdoc.[...] ocid=1007497@library_a&dtype=0-0&dinst=0.
Feb. 8, 1996 Amendment in Response to office Action in relation to U.S. Appl. No. 08/428,809.
U.S. Appl. No. 08/900,417, filed Jul. 25, 1997, Daniels.
EPO Opposition Statement of Grounds of Appeal for EP1099341 dated Feb. 28, 2011.
Counterstatement of the Patentee for European Patent EP-B-1099341 (Feb. 23, 2006).
EPO Opposition Submission for European Patent EP-B-1099341 dated Mar. 19, 2010.
Hirtz, G. et al., "Open TV: Betriebssystem Fuer Interaktives Fernsehen," Fernseh Und Kino-Technik, de vde Verlag GmbH, Berlin, Germany, vol. 50, No. 3, Mar. 1, 1996, pp. 84-89, XP000581417, ISSN: 0015-0142 (Translation, pp. 1-9).
International Preliminary Examination Report, International Application No. PCT/US97/18664, Dec. 7, 1998, 10 pages.

(56) References Cited

OTHER PUBLICATIONS

Ochiai et al., "@randomTV: A New TV System," NEC C&C Media Research Laboratories, Mar. 17, 1998, pp. 3-302-3-303 (concise explanation included in Supp. IDS).
Opposition against EP99935637 by Fast TV Server AG (Aug. 3, 2005).
Opposition against EP99935637 by Velocity 303 Limited (Aug. 3, 2005).
Submission by Velocity in European Patent No. 1099341 (Mar. 19, 2010).
Supplementary European Search Report, Feb. 25, 2000, Application No. EP 97 91 0985.
Brad Schepp et al., "The Complete Guide to CompuServe," Chapter 7, "IQuest and General Information Gathering," pp. 211-258, (McGraw-Hill Osborne Media, Har/Dis edition 1990).
"A Financial Times Survey: Viewdata (Advertisement)," Financial Times, Mar. 20, 1979.
"Dial M for Movie," Funkschau Nov. 1994, Perspektiven, Video on Demand, pp. 78-79. (English language translation attached.).
"Dialing the printed page," ITT in Europe Profile, 11/Spring 1977.
"Electronic Program Guide via Internet," Research Disclosure, Kenneth Mason Publications, Hampshire, GB Nr. 385 (May 1996) p. 276, ISSN:0374-4353.
"Growing US interest in the impact of viewdata," Computing Weekly, Jul. 20, 1978.
"LISTS> What's on Tonite TV Listings" Internet Article, [Online], Jan. 28, 1995, XP002378869 Retrieved from the Internet: URL: www.scout.wisc.edu/Projects/PastProjects/NH/95-01-31/0018.html> [retrieved on Apr. 28, 2006] *the whole document*.
"Open TV für interaktives Fernsehen," Trend & Technik, 9-95 RFE, p. 100. (English language translation attached.).
"Prodigy Launches Interactive TV Listing," Apr. 22, 1994, Public Broadcasting Report.
"Teletext presents the alternative view," Financial Times, Oct. 24, 1977.
"Three men on a Viewdata bike," The Economist, Mar. 25, 1978.
"TV Guide Online Set for Fall," Entertainment Marketing Letter, Aug. 1994.
"UVSG Offers System-Specific Web Site Development for OPS," press release of United Video Satellite Group, Apr. 12, 1996.
"UVSG Teams With Microsoft on Internet Information Server," press release of United Video Satellite Group, Feb. 22, 1996.
"Viewdata and its potential impact in the USA: Final Report/vol. One, The UK Experience," Link and Butler Cox & Partners Limited, Oct. 1978.
"Viewdata moves in US but GEC may lose out," Computing Weekly, Jan. 25, 1978.
"Viewdata Service Terminal Specification," British Post Office, Issue 5, Aug. 1978.
Armstrong, L., "Channel-Surfing's next wave: Henry Yuen's interactive TV guide takes on TCI and Viacom," BusinessWeek, Jul. 31, 1995.
Arnold, W.F., "Britain to get wired city—via telephone," Electronics, Mar. 4, 1976, at 76.
Bach U et al, "Multimediales-TV-Geraet," Part 1, Radio Fernsehen Electronik, De, Veb, Verlag, Technik, Berlin, vol. 45, No. 9, Aug. 1, 1996, pp. 28, 30-31, XP 000636538, ISSN: 1436-1574. (English language translation attached.).
Bach U et al. "Multimedia-Terminal ALS Endgeraet," Funkschau, De, Franzis-Verlag K.G. Munchen, vol. 68, No. 6, Mar. 1, 1996, pp. 70-75, XP 000556486, ISSN: 0016-2841. (English language translation attached.).
Blahut et al., "Interactive Television," Proceedings of the IEEE, Jul. 1995.
Boyd-Merritt, R., "Television wires two-way video," Electronic Engineering Times, Apr. 25, 1994.
ClickTV television program guide website of TVData of Queensbury, New York. This website is located at www.clicktv.com (as printed from the Internet on Aug. 13, 1997).
Day, R., "The Great PC/TV Debate," OEM Magazine, Jul. 1, 1996.

DirecTV Plus2 System, Thompson Consumer Electronics, Inc. (1999).
Hobbes Internet Timeline, Mar. 22, 2007.
Holland, G.L., "NAPLPS standard defines graphics and text communications," EDN, Jan. 10, 1985, at 179.
Iitusuka, Honbashi, Kuwana, Building Internet TV Guide Service 1 and 2, the 53rd National Conference Proceedings, Japan, Information Processing Society of Japan, Sep. 6, 1996 p. 3-227 to 230.
Kai et al., Development of a Simulation System for Integrated Services Television, Report from Information Processing Society of Japan, Japan, Sep. 13, 1996, vol. 96, No. 90 p. 13-20. (Partial English translation attached.).
Keith Lynch's timeline of net related terms and concepts,Mar. 22, 2007.
Large, P., "Throw away the books—Viewdata's coming," Guardian, Jan. 10, 1978.
Large, P., "Viewdata, the invention that brings boundless advice and information to the home, also sets a test for the Post Office," Financial Guardian, Jun. 29, 1978.
Leftwich, Jim & Schein, Steve, StarSight Interactive Television Program Guide, Phase III, Functional/Interactional Architecture Specification Document, Orbit Interaction, Palo Alto, California.
Leftwich, Jim, Lai, Willy & Schein, Steve, StarSight Interactive Television Program Guide, Phase IV, Functional/Interactional Architecture Specification Document, Orbit Interaction, Palo Alto, California, published before Apr. 19, 1995.
Little et al., :A Digital On-Demand Video Service Suporting Content-Based Queries, ACM Multimedia 93 Proceedings,.pp. 427-436, Jul. 1993.
Lloyd, J., "Impact of technology," Financial Times, Jul. 1978.
Miller, M.D., "A Scenario for the Deployment of Interactive Multimedia Cable Television Systems in the United States in the 1990s," IEEE, 1994.
Money, S.A., "Teletext and Viewdata," Butterworth & Co. Ltd., London, 1979.
Mosley, J.D., "NAPLPS chip sets, though scarce, satisfy limited US videotex demand," EDN, Mar. 21, 1985, at 57.
Owen, K., "How dial-a-fact is coming closer to home," The Times, Sep. 30, 1977.
Owen, K., "Why the Post Office is so excited by its plans for a TV screen information service," The Times, Sep. 26, 1976.
PCT Notification of Transmittal of International Search Report, Intl. Application No. PCT/US00/05887 (WO 00/52930), Aug. 2000, 2 pages.
Poole, J., "Demand for Viewdata grows," Sunday Times, Feb. 10, 1977.
Printout from Google News Archives, Mar. 22, 2007.
Qayyum, H., "Using IVDS and VBI for Interactive Television," IEEE, Jun. 10, 1996.
Rajapakshe et al., "Video on demand," (last modified Jun. 1995) http://www.doc.ic.ac.uk/~nd/surprise_95/journal/vol4/shr/report.html.
Rath et al., "Set-Top Box Control Software: A Key Component in Digital Video," Philips Journal of Research, vol. 50, No. 1/2 1996, at 185.
Rosch, G.D., "New data and information system set for commercial market trial," Telephony, Mar. 20, 1978, at 96.
Ruffler et al., "InfoRadio on Demand, WebTV and digiTaz—Telecommerce Case Studies," May 23, 1996.
Ryan, M., "Interactive TV Takes a Corporte Twist," Electronic Engineering Times, Jul. 10, 1995.
Schauer, T.: Internet Article, [Online] Sep. 28, 1995, XP002378870, Retrieved from the Internet: URL: www.vision2020.moscow.com/Archives/1995/9509/0058.htlm> [retrieved on Apr. 28, 2006] *the whole document*.
Schmuckler, Eric, "A marriage that's made in cyberspace (television networks pursue links with online information services)," May 16, 1994, MediaWeek, v4, n20, p. 22 (3).
Selected pages from the "BBC Online—Schedules" web page. This web page is located at http://www.bbc.co.uk/schedules/ (as printed from the Internet on Oct. 19, 1999 and being dated as early as May 24, 1997).

(56) References Cited

OTHER PUBLICATIONS

Sharpless et al., "An advanced home terminal for interactive data communication," Conf. Rec. Int. Conf. Commun. ICC '77, IEEE, Jun. 12-15, 1977, at 19.6-47.
St. John Sandringham, "Dress rehearsal for the PRESTEL show," New Scientist, Jun. 1, 1978, at 586.
Statement in an Examination Report dated Aug. 2, 1999 for a counterpart foreign application filed in New Zealand in which the foreign Examiner alleges that he has used "the Internet to access television listings for BBC World television as far back as mid 1996 . . . ".
Stickland, D.C., "It's a common noun," T the Economist, Jun. 5, 1978.
Stokes, A., "The viewdata age: Power to the People," Computing Weekly, Jan. 1979.
The InfoBeat television program guide website of InfoBeat, Inc. This website is located at www.infobeat.com (as printed from the Internet on Dec. 8, 1997).
The television program guide website of Gist Communications, Inc. of New York, New York. This website is located at www.gist.com (as printed from the Internet on Aug. 14, 1997).
The television program guide website of TV Guide Entertainment Network. This website is located at www.tvguide.com (as printed from the Internet on Aug. 14-22, 1997).
TV Guide movie database Internet web pages printed on Aug. 12, 1999 (9 pages).
VideoGuide, Videoguide User's Manual, pp. 1-27.
Web TV and Its Consumer Electronics Licenses debut First Internet Television Network and Set Top Box XP 002113265 Retrieved from the Internet: <URL http://www.webtv.net/company/news/archive/License.html> 'retrieved on Aug. 25, 1999.
Whitehorn, K., "Viewdata and you," Observer, Jul. 30, 1978.
Wikipedia article on CompuServe, Mar. 22, 2007.
Wittig, H. et al.: "Intelligent Media Agents in Interactive Television Systems" Proceedings of the International Conference on Multimedia Computing and Systems, Los Alamitos, CA, US, May 15, 1995-May 18, 1995, pp. 182-189, XP00603484 p. 183, left hand column, paragraph 2, p. 184, right-hand column, paragraph 2 figure 4.
Yoshida, J., "Interactive TV a Blur," Electronic Engineering Times, Jan. 30, 1995.
U.S. Appl. No. 60/093,292, filed Jul. 17, 1998, Ellis.
U.S. Appl. No. 60/097,527, Ellis.
"Digital Video Broadcasting (DVB); DVB specification for data broadcasting," European Telecommunications Standards Institute, Draft EN 301 192 V1.2.1 (Jan. 1999).
"Set-Top Box for Interactive Services," by R.A. Bissell and A. Eales, Multimedia Telecommunications, Chapman & Hall, London, England, Edited by Bill Whyte, published 1997, Chapter 6, pp. 116-138.
"StarSight Telecast and GTE to Offer StarSight to GTE's First Video Service Customers; GTE Becomes First Telephone Company Service Provider to Ship StarSight-Capable Advanced Analog Converters From General Instrument," Business Wire, press release, Mar. 13, 1996.
Andrews, E.L., "Betting Big on Small-Dish TV," The New York Times, Dec. 15, 1993.
Beyond Broadcasting: Into the Cable Age, by Timothy Hollins, BFI Publishing, pp. 226-227 (1984).
Brown, R., "The TV Future is on Display as Tech Takes Center Stage," in May 9, 1988 volume of CableVision magazine.
U.S. Appl. No. 09/330,792.
U.S. Appl. No. 09/332,244.
U.S. Appl. No. 09/356,268.
U.S. Appl. No. 09/410,332.
U.S. Appl. No. 09/934,939.
Description of Digital Audio-Visual Functionalities, Digital Audio-Visual Council, DAVIC 1.3.1 Specification Part 1, Technical Report, 86 pages, 1998.
EBU Technical Review, published by European Broadcasting Union, Geneva, Switzerland, No. 275, Spring 1998, pp. 1-54.
Gavron, Jacquelyn, Moran, Joseph, How to Use Microsoft Windows NT 4 Workstation, 1996, entire document.
Interactive Television—A Comprehensive Guide for Multimedia Technologies, by Winston William Hodge, McGraw-Hill, pp, 13-15 (1995).
Komarinski, Mark, Anonymous FTP p. 1, May 1, 1995 Linux Journal, entire document.
Letter from Time Warner to FCC, available at http://ecfsdocs.fcc.gov/filings/1995/03/24/142721.html, Mar. 24, 1995.
Microsoft Interactive Television in Detail ("MITV"), © 1995 Microsoft Corporation, 88 pages.
Piesing, J., "Introduction to the MHP PVR/PDR/DVR Specification," Chair "Technical Aspects of the MHP" Philips Applied Technologies, Redhill, UK, Copyright Digital Video Broadcasting Project DVB, undated.
Postel, J., Reynolds, J., Request for Comments: 959 File Transfer Protocol, Oct. 1985, entire document.
Saito, Takeshi, et al., "Homenetwork Architecture Considering Digital Home Appliance," Technical Committee meeting of the Institute of Electronics, Information and Communication Engineers (IEICE), Japan, Nov. 6, 1997, vol. 97, No. 368, p. 57-64.
Sanger, E., "TV Viewers Calling the Tune in Interactive Systems," New York Newsday, Nassau and Suffolk edition, Business Section, Feb. 12, 1989.
Stump, M., "TCI's Pre-Compression Trial," CableWorld, vol. 6, No. 14, Apr. 4, 1994, p. 4.
Umstead, R.T., "Dimension Will Sell Ads During Suns' PPV Games," Multichannel News, Nov. 15, 1993.
Winter, C., "Personal Computers a La Carte," Chicago Tribune, accessible at http://articles.chicagotribune.com/1986-06-16/business/8602130112_1_computer-system-ibm-pc-microprocessor, Jun. 16, 1986.
"Verknuepfung von TV mit Internet," Funkschau, De, Franzis—Verlag K.G. Munchen, vol. 68, No. 18, Aug. 16, 1996, pp. 70-71, XP 000631189, ISSN: 0016-2841 (Translation, pp. 1-3).
Research Disclosure, No. 32926, "Installation of Consumer Apparatuses," Sep. 1991, No. 329, Havant GB, p. 657, XP226205.
Office Action dated Feb. 28, 2014 in U.S. Appl. No. 13/368,771.
Cordero, Richard, "Video Dialtone: Its Potential for Social Change," The Journal of Business Forecasting Methods & Systems, vol. 15, No. 1, Spring 1996, pp. 16-22 and 27.
Jarvey, Paul, "VCR Plus Will Help With Digit Dilemma: [All Edition]," Telegram & Gazette, A9, Worcester, Massachusetts, Jun. 11, 1991.
"Technology Projections: 2001," Anonymous, Direct Marketing, vol. 55, No. 1, May 1992, pp. 23-25.
Expert Report of John Roop (with Appendix A and Appendix B), dated Nov. 2, 2012, 81 pages.
Norton, Perry I., "Dow Jones' Cable Experiment—Accessing the News Service via TV is Faster and Cheaper," InfoWorld, vol. 6 No. 29, Jul. 16, 1984, p. 35.
TV Guide Magazine article, Rochester Edition, Oct. 13-19, 1990, pp. 56 and 57.
Uniden UST-4800 Integrated Receiver/Descrambler Installation Guide, dated 1990, 60 pages.
Office Action dated Jul. 11, 2013, U.S. Appl. No. 13/368,771.
US 6,118,443, 09/2000, Allison et al. (withdrawn)

* cited by examiner $\underbrace{0 \quad 0}_{300} \underbrace{1}_{302} \underbrace{1 \quad 2 \quad 3}_{304}$ $\underbrace{0 \quad 0}_{300} \underbrace{2}_{302a} \underbrace{3 \quad 4 \quad 1}_{304a} \underbrace{*}_{306} \underbrace{7}_{302b} \underbrace{1 \quad 2 \quad 3}_{304b}$

SYSTEM AND METHOD FOR USING TELEVISION INFORMATION CODES

CROSS-REFERENCE TO RELATED APPLICATION

This application claims the benefit of U.S. Provisional Application No. 60/617,025, filed on Oct. 8, 2004, the content of which is incorporated herein by reference.

FIELD OF THE INVENTION

This invention relates generally to television systems, and more particularly, to a system and method for using information codes for recording television programs.

BACKGROUND OF THE INVENTION

One popular mechanism for recording television programs is via a VCR Plus+™ system developed by the Gemstar Development Corporation. In order to record a television program using a VCR Plus+™ equipped system, a user accesses television program listings from a newspaper, magazine, or web site. If a desired program listing is associated with a VCR Plus+™ PLUSCODE™ number, and the viewer has a video recorder equipped with a VCR Plus+™ system, the viewer may enter the PLUSCODE™ into the video recorder and the video recorder will be programmed to record the selected program when it airs. In this system, a PLUSCODE™ number has encoded in it the channel, time, date and length for the program associated with the PLUSCODE™ number. A VCR Plus+™ equipped VCR decodes the PLUSCODE™ number into the encoded channel, date, time and length and then uses the channel, date, time and length to record the program. The VCR Plus+™ system and related technology is described in more detail in U.S. Pat. No. 5,307,173, which is incorporated by reference as if set forth herein in full. Although PLUSCODE™ numbers greatly facilitate the recording of individual television programs, when a viewer wants to record multiple television programs, he or she must generally individually enter the PLUSCODE™ numbers for each desired television program, one at a time. There could be, however, a common characteristic identifying the programs desired to be recorded by the viewer. For example, the programs could all have a particular actor, share a particular theme, or the like. Accordingly, there is a need for selecting television programs for recording based on codes that identify particular characteristics of the television programs.

SUMMARY OF THE INVENTION

According to one embodiment, the present invention is directed to a video recording system that includes a data store storing electronic program guide (EPG) data for a television program, the EPG data including for the television program an associated filter criteria; a user input transmitting an information code including a particular filter criteria, wherein the particular filter criteria is not human readable from the information code; a microprocessor coupled to the data store and the user input, the microprocessor receiving and decoding the information code including the particular filter criteria, comparing the particular filter criteria in the decoded information code with the filter criteria included in the EPG data for the television program, and storing the television program for recording based on the comparison.

According to another embodiment, the present invention is directed to a computer-implemented method for selecting video programs for recording. The method includes storing electronic program guide (EPG) data for a television program, the EPG data including for the television program an associated filter criteria; receiving from a user input an information code including a particular filter criteria, wherein the particular filter criteria is not human readable from the information code; decoding the received information code; comparing the particular filter criteria in the decoded information code with the filter criteria included in the EPG data for the television program; and storing the television program for recording based on the comparison.

According to a further embodiment, the present invention is directed to a method for recording video programs in a data communications network including a web server hosting a website and a television system including a video recorder coupled to the web server. The method includes displaying information on one or more recommended video programs on the website; selecting from the website one or more of the recommended video programs; transmitting from the website to the television system a command to record the selected one or more of the recommended video programs, the selected one or more of the recommended video programs being identified via one or more information codes; and automatically invoking the video recorder to record the selected one or more of the recommended video programs.

DETAILED DESCRIPTION

In general terms, an embodiment of the present invention is directed to a television system configured to search for television programs based on information codes, also referred to as filter codes or filters, entered by a user. According to one embodiment of the invention, information codes are published in newspapers, magazines, web sites, or other places where VCR Plus+™ PLUSCODE™ numbers would normally be published. Like PLUSCODE™ numbers, information codes may be used to easily program a video recorder to record one or more television programs matching the information codes. Unlike a PLUSCODE™ number that identifies a single television program based on channel, date, time, and length information, however, an information code may identify various programs based on an actor, program content rating, theme, category, genre, program package, or the like. For example, entry of an information code identifying a particular program package, such as, for example, the Summer Olympics or the World Cup program package, may cause the VCR to record all programs in the identified program package without having the user manually program the recording of each television program individually. Information codes are typically numeric or alphanumeric codes that are not human readable. More specifically, without having or memorizing a table matching code numbers or letters to categories and category IDs, a human would not know what category or category ID are represented by a particular information code.

Figure 1:
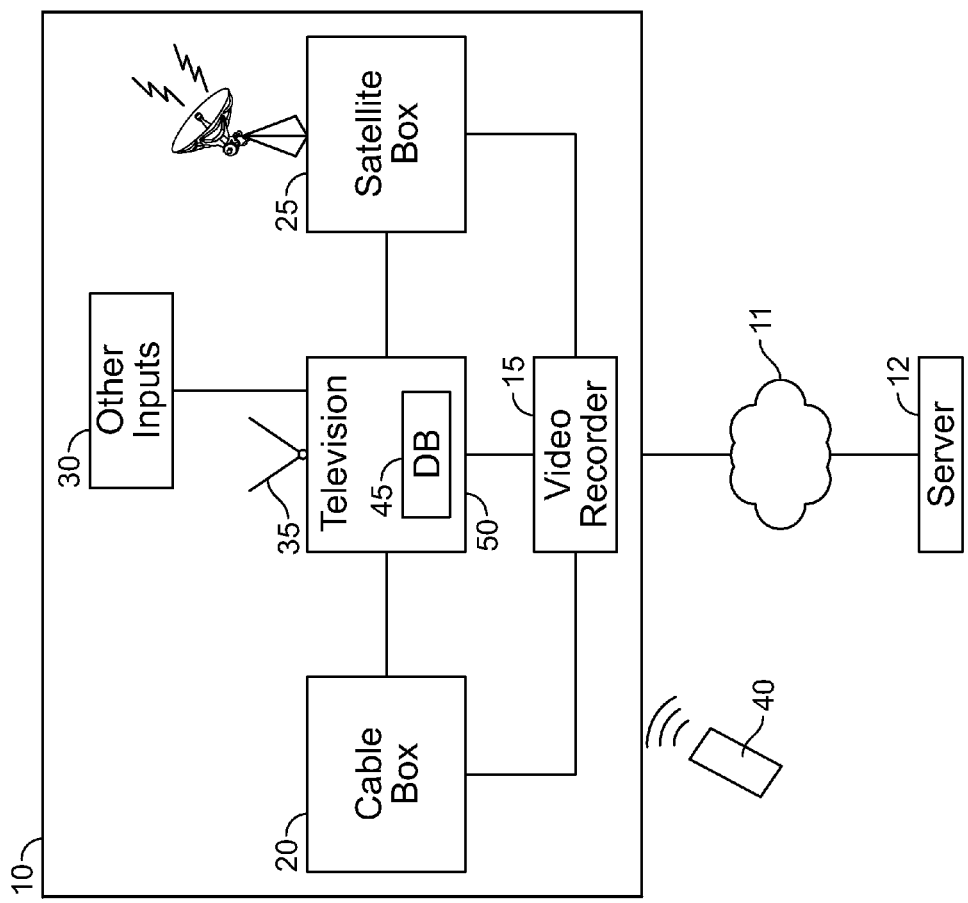
FIG. 1 is a schematic block diagram of an interactive television schedule system including a television system and a cable box according to one embodiment of the invention.

FIG. 1 is a schematic block diagram of a television system 10 configured to recognize information codes entered by a user according to one embodiment of the invention. The television system 10 includes a television 50 coupled to a video recorder 15, such as, for example, a video cassette recorder, digital recorder, or the like. The television 50 and/or video recorder 15 may also be coupled to a cable box 20, a satellite receiver 25, an antenna 35, or other input device 30 that supplies video signals or data known in the art or developed later. The television system 10 may also be coupled to a server 12 over a data communications network 11 such as, for example, the Internet.

According to one embodiment of the invention, the television system 10 is configured with an electronic program guide (EPG) database 45 storing EPG data for broadcast television programs, video-on-demand programs, and the like (collectively referred to as television programs). Such EPG data includes, but is not limited to, program titles, channel information, date and time information, program descriptions, information codes, PLUSCODE™ numbers, and the like. Although the EPG database 45 is illustrated as residing in the television 50, a person of skill in the art should recognize that the database 45 and associated program instructions for interacting with the database may reside in any other device associated with the television system.

According to one embodiment of the invention, viewer input data is provided to the television system 10 via a viewer input device 40. The viewer input device 40 may take the form of an IR remote control, a keyboard, a keypad, a joystick, a mouse, a track ball, a touch pad, or any other input device conventional in the art.

Many different transmission schemes are available for providing the EPG data to the television system 10. For example, the EPG data may be provided via cable, satellite, and/or over-the-air (OTA) broadcast. EPG data may also be provided via coax cables, telephone lines, fiber optic cables, and the like. EPG data may be communicated over private networks, point to point connections or public networks, like the Internet.

Figure 2:
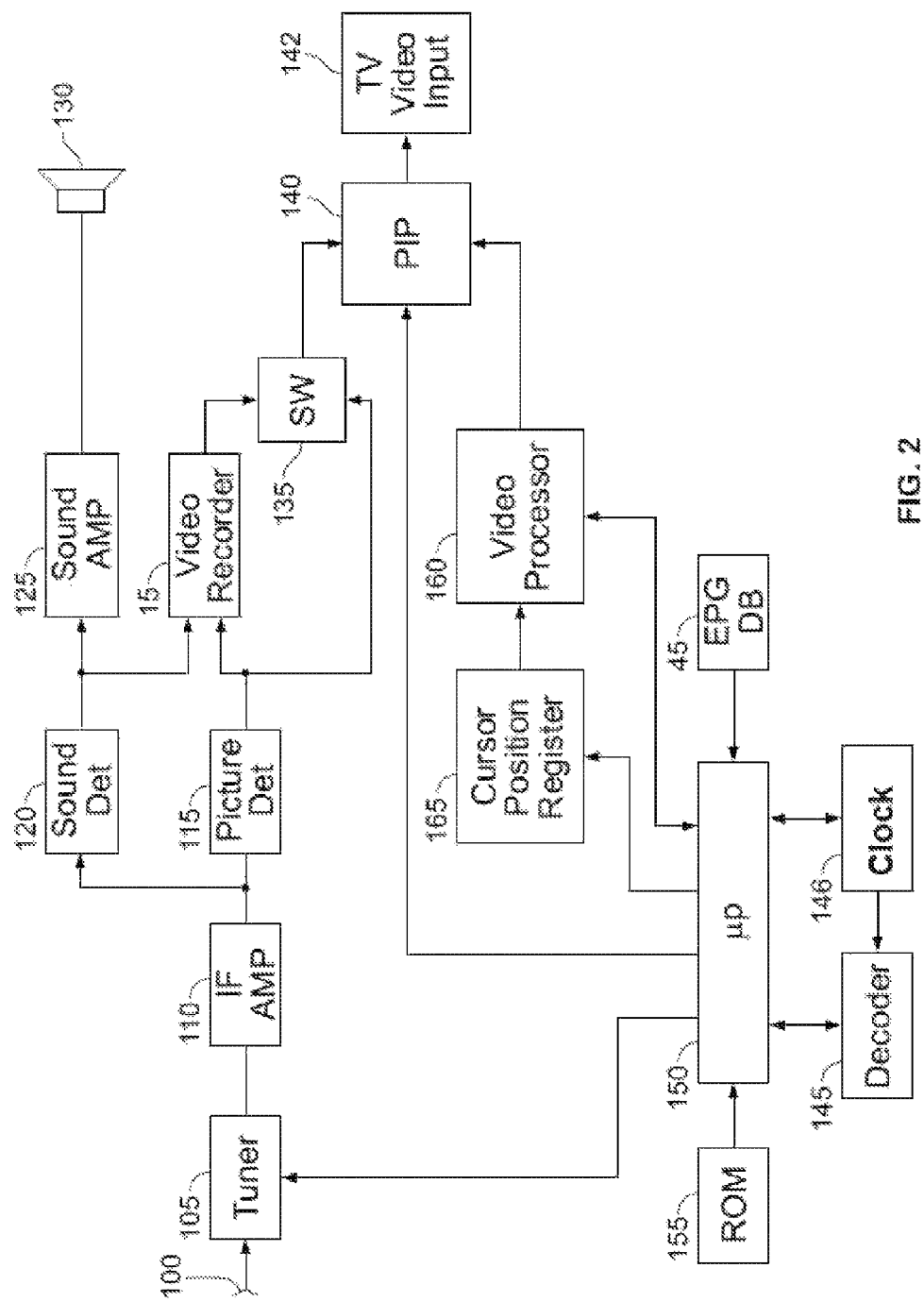
FIG. 2 is a more detailed schematic block diagram of the cable box of FIG. 1.

FIG. 2 is a more detailed schematic block diagram of the television system 10 of FIG. 1. A source of television signals 100, such as the antenna 35, cable box 20, or satellite receiver 25 is coupled to a television tuner 105. The output of the tuner 105 is, according to one embodiment of the invention, a modulated intermediate frequency signal containing video and audio television information. The tuner 105 is connected by an intermediate frequency amplifier (IF AMP) 110 to a picture detector (PICTURE DET) 115 and a sound detector (SOUND DET) 120, which produce base band video and audio signals, respectively. The audio signal is coupled by a sound amplifier (SOUND AMP) 125 to a loudspeaker 130. The video signal is coupled by a video amplifier (not shown) to one input of a switch 135. The sound detector 120 and picture detector 115 are connected to the audio and video inputs, respectively, of the video recorder 15. Alternatively, television signal source 100 may be directly connected to the RF input of the video recorder 15 or another external tuning device if its internal tuner and demodulating circuitry is to be utilized.

According to the illustrated embodiment, the output of the video recorder 15 is connected to the other input of the switch 135. The output of the switch 135 is connected to one input of a conventional picture-in-picture (PIP) integrated circuit chip 140. The output of the PIP chip 140 is connected to a video input 142 of the television 50.

The television system 10 also includes a microprocessor 150 coupled to a read-only memory (ROM) 155 and the EPG database 45. The ROM stores an operating program for controlling the operation of the microprocessor.

According to one embodiment of the invention, the EPG database 45 is contained in an updatable memory, such as, for example, a RAM. The EPG data may be updated by a continuous data link in a vertical blanking interval (VBI) or digital video broadcast data of a television channel broadcast to the television system 10 in a well known fashion or any other manner, as discussed above in connection with FIG. 1.

A video processor 160 coupled to the microprocessor 150 controls the display of EPG data on the television 50. When the viewer wishes to see television program schedule information or information regarding to news, sports, or local events and businesses, the microprocessor 150 recalls a portion of the relevant data from the EPG database 45 and couples it to video processor 160, where the program listings are formatted for display. According to one embodiment of the invention, the information stored in video processor 160 is a bit map of what is displayed on the screen of television 50.

The microprocessor 150 is further coupled to the tuner 105 for channel change, to the video recorder 15 for play/record selection and start/stop, to the switch 135 for selection of one of its inputs, and to the PIP chip 140 for selection of the mode of PIP operation.

According to one embodiment of the invention, the viewer input device 40 controls the microprocessor 150 by cursor movement on the screen of the television 50. In this regard, the microprocessor 150 and video processor 160 are coupled to a cursor position register 165 identifying a cursor position on the screen. According to another embodiment of the invention, the viewer input device 40 controls the microprocessor by selection of particular keys on the viewer input device.

According to one embodiment of the invention, the television system 10 includes a decoder 145 coupled to the microprocessor 150 for decoding encoded data transmitted by the viewer input device 40. Such encoded data include PLUSCODE™ numbers or information codes identifying a type of television program to record. According to one embodiment of the invention, the decoder 145 is coupled to a clock 146, allowing the decoding to be a function of the clock. This helps lend a measure of security to the decoding technique, and makes it harder for others to replicate the information codes. According to this embodiment, the encoding is also a function of a clock. The encoding and decoding of information codes may be performed in a manner similar to the encoding and decoding of PLUSCODE™ numbers, as is described in further detail in U.S. Pat. No. 6,466,734, the content of which is incorporated herein by reference. In one embodiment, I-codes are also decoded. I-codes, as described in more detail in the '734 patent, do not include an embedded date, so that the same I-code can be used to record a program broadcast for several days at the same time on the same channel on any of these several days. Thus, as long as the I-code is entered into the VCR Plus+™ system on any day on which the program is broadcast, the VCR Plus+™ system will record the next broadcast of the program during the twenty-four hour period following entry of the I-code. In one embodiment, I-codes are distinguished from PLUSCODE™ numbers (G-codes) by an escape code comprising a single leading zero.

According to one embodiment of the invention, the decoder 145 is implemented as a microcontroller with an embedded RAM and ROM (not shown) for program and table storage. The decoder 145 and/or clock 146 may reside in the television 50, video recorder 15, or any other suitable device associated with the television system 10. In another embodiment, instead of using a separate microcontroller for the decoder 145, decoding instructions may be stored in memory already resident in the television system 10, such as, for example, in the ROM 155.

According to one embodiment of the invention, the EPG data received by the television system is stored in the EPG database 45 as show information package (SIP) structures. Organization of an EPG database containing SIP structures is described in further detail in WO 99/65242, the content of which is incorporated herein by reference. According to another embodiment of the invention, the EPG database 45 may be organized as schedule data structures and theme data structures linked by handles and handle tables, as is described in further detail in U.S. Pat. No. 6,002,394, the content of which is incorporated herein by reference.

Figure 3:
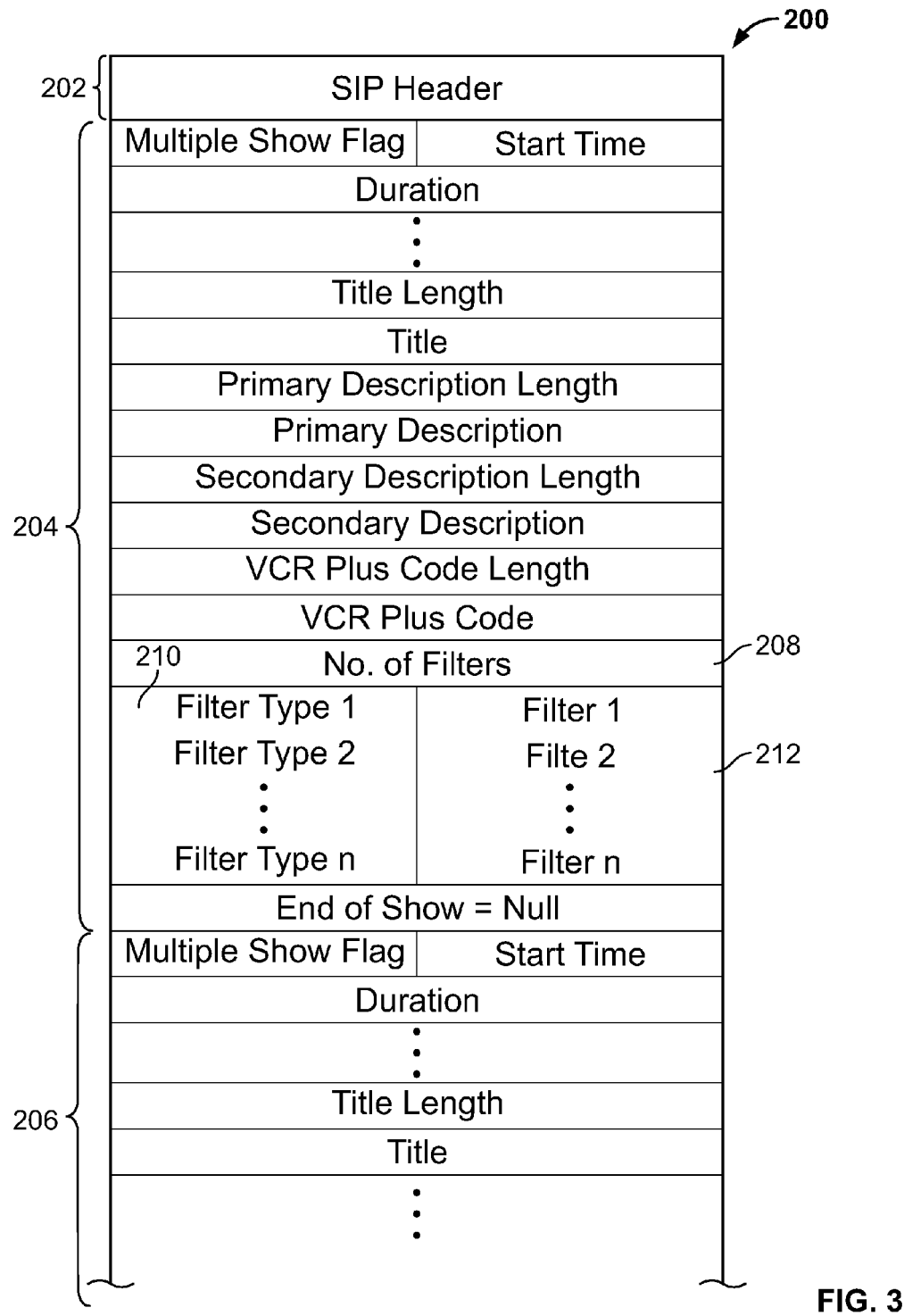
FIG. 3 is a more detailed schematic block diagram of the television system of FIG. 1.

FIG. 3 is a schematic illustration of a SIP structure 200 according to one embodiment of the invention. The structure includes a SIP header 202 with general information applicable to the entire structure. For example, the SIP header 202 may include information on an amount of memory needed to store the SIP structure, and a control date indicating the day for which the SIP structure contains data. The SIP header may also include indexing bits, such as, for example, program category bits, used for indexing the programs inside the SIP structure.

Following the SIP header 202 are program data blocks 204, 206 that contain information specific to a particular television program. Information contained in each program data block includes, for example, information for calculating the start time of the television program, a duration of the program, a title of the program, a description of the program, and a PLUSCODE™ number.

In addition to the above, the program data block includes filter information used for filtering television programs based on information codes provided by a user. The filter information may include a total number of filters 208 associated with the television program, a filter category 210, and a corresponding filter identifier (ID) 212 for the filter category. The filter category 210 and corresponding filter ID 212 together identify a particular filter associated with the television program.

According to one embodiment of the invention, the filter category may indicate an actor filter, content rating filter, theme filter, category filter, genre filter, program package filter, or the like. The filter ID 212 may indicate a particular filter within the filter category 210. For example, "Tom Cruise," "Richard Gere," "Uma Thurman," all belong to an actor filter category. Thus, if "01" indicates an actor filter and "1234" indicates Richard Gere, a television program containing Richard Gere as an actor may store as a filter category the code "01" and as a corresponding filter identifier, the code "1234."

Figures 4, 5A, 5B:
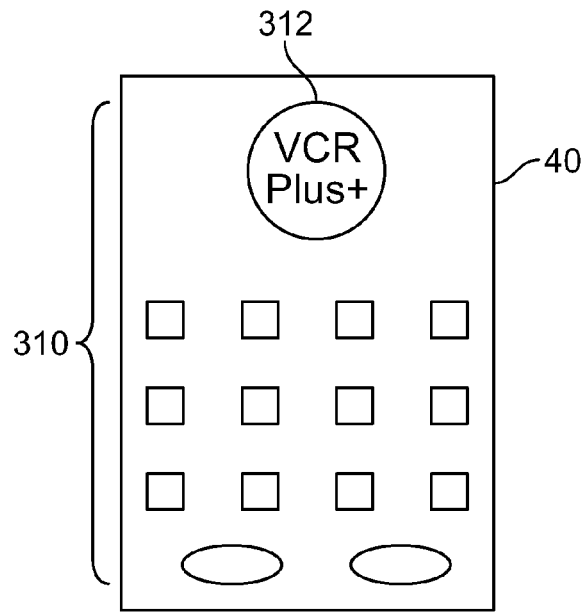
FIG. 4 is an illustration of an EPG screen displayed on the television system of FIG. 1.
FIG. 5A is a schematic diagram conceptually illustrating an exemplary information code according to one embodiment of the invention.
FIG. 5B is a schematic diagram conceptually illustrating an exemplary information code according to another embodiment of the invention.

FIG. 4 is a schematic diagram of the input device 40 for entering information codes according to one embodiment of the invention. The input device 40 includes various push buttons, keys, switches, knobs, and/or the like (collectively referenced at 310) that may be selected by a user to navigate an interactive program guide and/or enter desired selections or commands for transmitting to the television system 10. According to one embodiment of the invention, the input device 40 includes a VCR Plus+™ button 312 for entering the PLUSCODE™ numbers and information codes. According to another embodiment of the invention, the input device 40 includes an information code button (not shown) separate from the VCR Plus+™ button used to only enter information codes.

FIG. 5A is a schematic diagram conceptually illustrating an exemplary information code according to one embodiment of the invention. According to the illustrated embodiment, the information code is made up of various numbers, where the first two numbers act as an escape code 300, such as, for example, "00," to indicate that the numbers that follow are part of an information code and not a PLUSCODE™ number. Of course, the escape code is not necessary if the input device includes a separate information code button that may be selected prior to the entering of the information code.

Following the escape code 300 is a filter category 302 and a filter ID 304. The filter category 302 and filter ID 304 that are entered by a user as part of an information code are similar to the filter category 210 and filter ID 212 in a SIP structure 200. In the illustrated embodiment, the filter category 302 is an integer between 0 and 9. The filter ID 304 is a combination of one or more integers whose values also range between 0 and 9. A person of skill in the art should recognize that the number of integers used to define the filter category and ID may vary based on the total number of filter categories and IDs to be defined.

In an alternate embodiment, the filter category and ID are compressed to form the information. In a process similar to the process for PLUSCODE™ numbers and I-codes, filter categories and IDs are each represented in binary numbers with a set number of bits. In one embodiment, the filter category is represented by a 7 bit binary number $C_7C_6C_5C_4C_3C_2C_1$ that can represent 128 different categories and the category ID is represented by a 22 bit binary number $I_{22}I_{21} \ldots I_2I_1$ that can represent 4,194,304 different category IDs. The most common categories are assigned the lowest numbers, having zeros in the most significant bits such as $C_5$-$C_7$. Similarly, the most common category IDs are assigned the lowest numbers, having zeros in the most significant bits such as $I_6$-$I_{22}$. The category and category ID bits are then mixed in a predetermined pattern, such as $I_{22}I_{21} \ldots I_{10}I_9C_7I_8C_6I_7I_6C_5I_5C_4I_4I_3C_3I_2C_2I_1C_1$ before being converted back into a decimal number that will be 9 decimal digits or less ($2^{29}$=536,870,912, a 9 digit decimal number). A category with a code less than 32 (decimal) will have zeros in the two most significant bits ($C_6$-$C_7$) and a category ID with a code less than 256 (decimal) will have zeros in the 14 most significant bits ($I_8$-$I_{22}$). Thus, an information code for a category code less than 32 (decimal) and a category ID with a code less than 256 (decimal) will have mixed binary representation with leading zeroes in the most significant 16 bits, leaving only 13 bits containing meaningful bits. When this mixed binary number is converted into a decimal number, the leading zeroes can be dropped without changing the value of the code and a 13 bit binary number will convert into a decimal number of no more than 4 digits. Thus, using the mixed binary number, the combinations of the most common categories and category IDs results in information codes with the least number of decimal digits to make entry of the codes easier and reduce input errors.

In another embodiment, the information code, generated using the mixed binary number or not, is encrypted by any known encryption method, including, but not limited to, encryption methods that are time or date dependent.

The encrypted and/or mixed binary information codes are decoded in the opposite manner as they are encoded.

FIG. 5B is a schematic diagram conceptually illustrating an exemplary information code according to another embodiment of the invention. According to this embodiment, an information code may include two or more filter categories 302a, 302b and their associated filter IDs 304a, 304b separated by an operator signal 306. The operator signal 306 is associated with a particular Boolean operation, such as, for example, an "AND," an "OR," or a "NOT" operation. For example, an "AND" operator between two filters indicates that the user is searching for television programs containing both filters.

Figure 6:
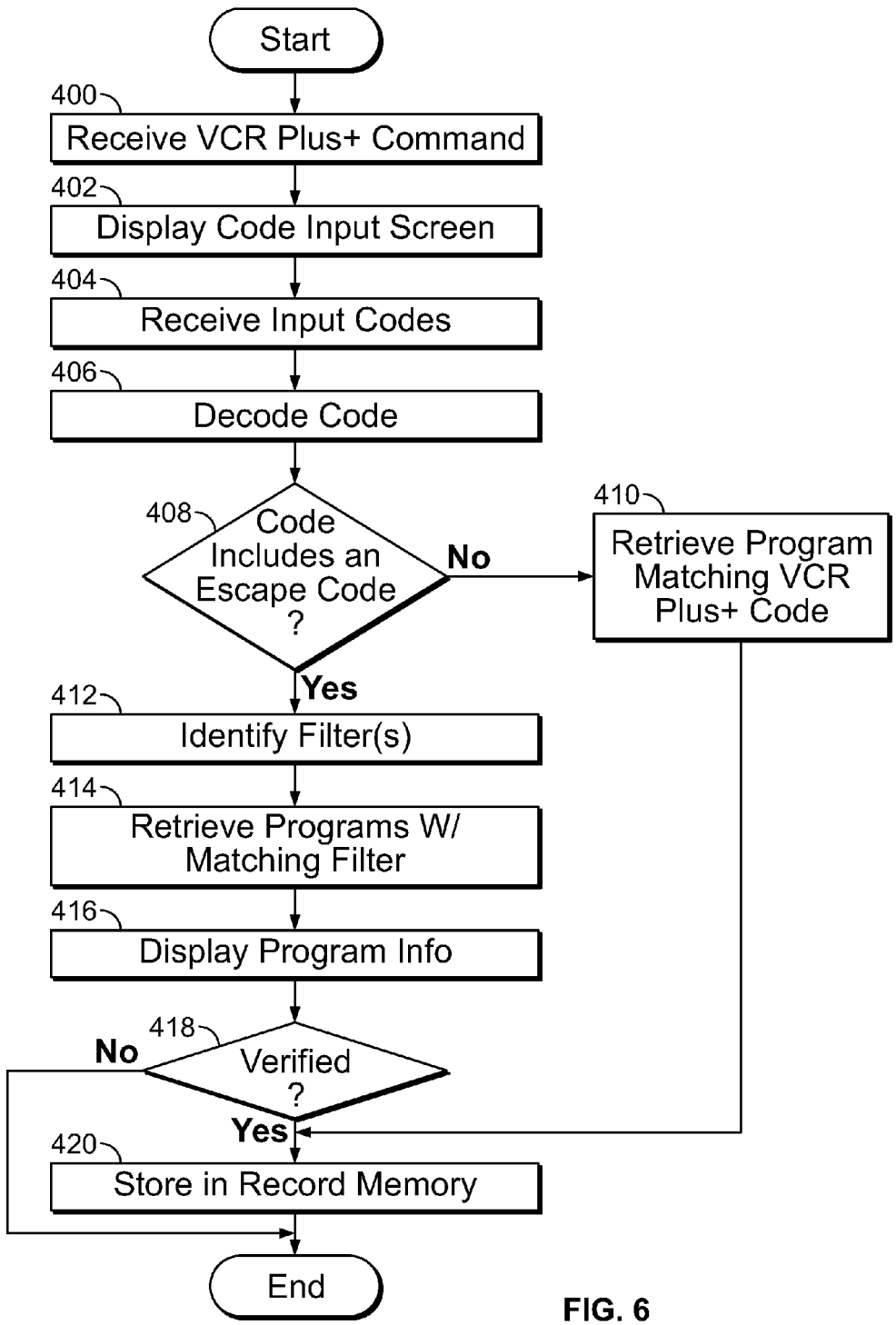
FIG. 6 is a flow diagram for processing information codes according to one embodiment of the invention.

FIG. 6 is a flow diagram for processing information codes according to one embodiment of the invention. The process may be described in terms of a software routine executed by the microprocessor 150 based on instructions stored in the ROM 155. A person of skill in the art should recognize, however, that the routine may be executed via hardware, firmware (e.g. via an ASIC), or in any combination of software, firmware, and/or hardware. Furthermore, the steps of the process may be executed in the indicated order or in any other order recognized by a person of skill in the art.

The process starts, and in step 400, the microprocessor receives a VCR Plus+™ command transmitted by the input device 40. This may be done, for example, by the user selecting the VCR Plus+™ button 312 on the input device 40. If, however, the input device 40 includes a separate information code button, switch, or the like, the information code button is selected to cause the transmitting of an information code command. For purposes of this example, however, it is assumed that the user has selected a VCR Plus+™ button.

The microprocessor decodes the VCR Plus+™ command and in response, invokes the video processor 160 to display, in step 402, an input screen on the television 50 for allowing the user to enter a desired PLUSCODE™ number or information code. The input screen may display, for example, underscore characters equal to the total number of code digits expected to be entered by the user. As the user uses the input device 40 to enter the digits of the code, each digit is displayed on the portion of the screen marked by the underscore character for visual verification by the user.

The input screen may then prompt the user to select the frequency in which one or more programs matching the code are to be recorded. For example, the user may be able to select to record once, daily, or weekly. Selection of an "Enter" button on the input device transmits the entered code along with the frequency and other associated information to the microprocessor 150.

The microprocessor 150, in step 404, receives the entered code, and in step 406, invokes the decoder 145 to decode the received code. In step 408, a determination is made as to whether the code includes an escape code. If the answer is NO, the code is a PLUSCODE™ number, the PLUSCODE™ number is decoded into the encoded channel, date, time and length, and information on a program matching the decoded PLUSCODE™ number information is retrieved in step 410.

Otherwise, if the code includes an escape code, the user has entered an information code instead of a PLUSCODE™ number. If the escape code corresponds to an information code, the microprocessor 150 thus proceeds to retrieve, in step 412, the filter category 210 and filter ID 212 following the escape code. According to one embodiment of the invention, the filter category 210 and filter ID 212 are stored in memory and retrieved for matching upon reception of an EPG signal.

If the escape code corresponds to an I-code or other type of codes supported by the VCR Plus+™ system, such codes are decoded according to the type of code indicated by the escape code (not shown).

In step 414, the microprocessor searches the EPG database 45 or an EPG signal for SIP structures containing a matching filter category and ID, and retrieves program information contained in the matching SIP structures. In step 416, information on the retrieved program(s) is displayed on the television 50 for verification. In this regard, the user may review information on the retrieved programs, such as, for example, the program title, description, time, date, and length, and scroll down the list of programs using the input device to delete programs that he or she does not wish to record.

In step 418, a determination is made as to whether the user is finished with the verification process. The user may indicate that he/she is finished by selecting an accept button via the input device. In step 420, the programs accepted by the user are stored in a record memory, such as in the RAM. The information stored in the record memory may be, for example, the dates, times, and lengths of the programs to be recorded as retrieved from the corresponding SIP structures. The video recorder is then invoked for recording the stored programs at the indicated dates and times, for the indicated lengths of time.

According to one embodiment of the invention, programs may be recommended to a viewer for recording and/or viewing. Such recommendations may be accessible to the viewer over the Internet by accessing a website hosted by the server 12. One such exemplary website may be the TV Guide® website hosted by Gemstar-TV Guide International, Inc. In this regard, the television system 10 is configured to communicate with the server 12 over the cable box 20, satellite box 25, or other input device 30. The viewer may use the television system 10 to access the website hosted by the server 12, or alternatively, may use a personal computer or other computing device for the access.

Regardless of the manner in which the website is accessed, the viewer may select to record one or more recommended programs directly from the website, and the video recorder 15 may then be programmed to record the selected program(s). In this regard, one or more information codes are assigned to the recommended programs to identify them for recording. According to one embodiment of the invention, each recommended program is assigned a unique information code. This may be achieved, for example, by using the filter category 302 of the information code to indicate that the program is in a "recommended" category. Each filter ID 21 may then identify a different recommended program. This allows the viewer to individually select the recommended programs to be recorded.

According to another embodiment of the invention, the viewer may record the recommended programs based on their themes or categories. This may be achieved, for example, by using the escape code 300 portion of the information code to designate the programs to be recorded as being recommended programs. For example, escape code "11" may be used to indicate that the codes that follow are codes for recommended programs. The numbers following the escape code may then be associated with a filter category and filter ID, to allow programs having the same category or theme to be identified with the same information code. Alternatively, no separate escape code may be used to distinguish the recording of recommended programs.

According to a further embodiment of the invention, all currently recommended programs are assigned one information code. Upon providing this one information code, all the currently recommended programs are selected by the television system 10 for recording.

In order to program the video recorder to record one or more of the recommended programs, the viewer selects a record option from the website and identifies one or more information codes of the program(s) to be recorded. The record command along with one or more information codes associated with the selected program(s) are transmitted to the television system 10. The microprocessor 150 included in the television system 10 processes the information code(s) for recording the associated program(s) as is described above with respect to FIG. 6.

According to one embodiment of the invention, the recommendations may also be provided in printed form in newspapers or magazines. The recommendations may further be transmitted to the television system 10 on a periodic basis by, for example, a head end or broadcasting center. The recommendations may be stored in the EPG database 45 and displayed on the EPG guide when the user indicates he or she wishes to view the recommendations. According to one embodiment of the invention, the recommendations are customized based on view preference information.

Although this invention has been described in certain specific embodiments, those skilled in the art will have no difficulty devising variations to the described embodiment which in no way depart from the scope and spirit of the present invention. Moreover, to those skilled in the various arts, the invention itself herein will suggest solutions to other tasks and adaptations for other applications. It is the applicants intention to cover by claims all such uses of the invention and those changes and modifications which could be made to the embodiments of the invention herein chosen for the purpose of disclosure without departing from the spirit and scope of the invention. Thus, the present embodiments of the invention should be considered in all respects as illustrative and not restrictive, the scope of the invention to be indicated by the appended claims and their equivalents rather than the foregoing description.

What is claimed is:

1. A video recording system comprising:
    a data store that stores media guidance data for a plurality of television programs, the media guidance data including a first filter criteria associated with a first subset of the plurality of television programs and a second filter criteria associated with a second subset of the plurality of television programs, wherein the first subset and the second subset each comprise more than one program;
    a microprocessor coupled to the data store, wherein the microprocessor:
    receives input from a user that selects a symbol that is presented to the user in a form that prevents the user from identifying which of the first and second subsets of programs is associated with the symbol without referencing a look-up table, wherein the symbol includes an information code, the information code comprising one of the first and second filter criteria;
    decodes the information code to identify a user filter criteria;
    compares the user filter criteria to the first and second filter criteria, wherein the first and second filter criteria are each determined without user input;
    determines that the user filter criteria matches the first filter criteria;
    and without user input,
    identifies the first subset of the plurality of television programs associated with the first filter criteria for recording, and
    stores instructions to record the identified first subset of the plurality of television programs as a result of the identifying.

2. The system of claim 1, wherein the information code comprises a filter category and an identifier associated with the filter category, and wherein the filter category and the identifier associated with the filter category represent the user filter criteria.

3. The system of claim 2, wherein the filter category represents an actor or actress filter, and the identifier identifies a particular actor or actress.

4. The system of claim 2, wherein the filter category represents a theme or genre filter, and the identifier identifies a particular theme or genre.

5. The system of claim 1, wherein each filter criteria is unrelated to a program channel, date, time, or length.

6. The system of claim 1 wherein the microprocessor generates display of information on the more than one television programs in the first subset.

7. The system of claim 6, wherein at least one of the more than one programs is deleted from a list of programs to be recorded in response to a user command.

8. The system of claim 1, wherein the microprocessor compares a second user filter category and a second user identifier in the decoded information code with respectively a second filter category and a second identifier associated with a television program, and select the program associated with the second identifier for storage recording based on the comparison.

9. The system of claim 1, wherein the information code identifies a plurality of filter categories and associated filter identifiers for retrieving one or more programs based on the plurality of filter categories and associated filter identifiers.

10. The system of claim 1 wherein, based on the determination, none of the programs in the second subset are recorded.

11. The video recording system of claim 1, wherein the symbol is selected from a plurality of symbols that are presented to the user in a form that prevents the user from identifying which of the first and second subsets of programs is associated with the symbol without referencing a look-up table.

12. A computer-implemented method for selecting video programs for recording, the method comprising:
    storing media guidance data for a plurality of programs, the media guidance data including a first filter criteria associated with a first subset of the plurality of programs and a second filter criteria associated with a second subset of the plurality of programs, wherein the first subset and the second subset each comprise more than one program;
    receiving from a user input that selects a symbol that is presented to the user in a form that prevents the user from identifying which of the first and second subsets of programs is associated with the symbol without referencing a look-up table, wherein the symbol includes an information code, the information code comprising exactly one of the first and second filter criteria;
    decoding the received information code to identify a user filter criteria;
    comparing the user filter criteria to the first and second filter criteria, wherein the first and second filter criteria are each determined without user input;
    determining that the user filter criteria matches the first filter criteria; and without user input, identifying the first subset of the plurality of programs associated with the first filter criteria for recording, and storing instructions to record the identified first subset of the plurality of programs as a result of the identifying.

13. The method of claim 12, wherein the information code comprises a filter category and an identifier associated with the filter category, and wherein the filter category and the identifier associated with the filter category represent the user filter criteria.

14. The method of claim 13, wherein the filter category represents an actor or actress filter, and the identifier identifies a particular actor or actress.

15. The method of claim 13, wherein the filter category represents a theme or genre filter, and the identifier identifies a particular theme or genre.

16. The method of claim 12, wherein each filter criteria is unrelated to a program channel, date, time, or length.

17. The method of claim 12, further comprising:
displaying information on one or more programs in the first subset.

18. The method of claim 17 further comprising:
deleting at least one program from a list of programs to be recorded in response to a user command.

19. The method of claim 12 wherein, based on the determination, none of the programs in the second subset are recorded.

20. The method of claim 10, wherein the symbol is selected from a plurality of symbols that are presented to the user in a form that prevents the user from identifying which of the first and second subsets of programs is associated with the symbol without referencing a look-up table.

21. A method for recording video programs in a data communications network including a web server hosting a website and a system including a video recorder coupled to the web server, the method comprising:
generating a display of information on a plurality of recommended video programs on the website;
associating a first non-human readable filter criteria with a first subset of the plurality of recommended video programs and associating a second non-human readable filter criteria with a second subset of the plurality of recommended video programs, wherein the first subset and the second subset each comprise more than one recommended video program;
receiving input from a user that selects a symbol that is presented to the user in a form that prevents the user from identifying which of the first and second subsets of programs is associated with the symbol without referencing a look-up table, wherein the symbol identifies more than one of the recommended video programs;
comparing, using control circuitry, the symbol to the first filter criteria and the second filter criteria;
determining that the user filter criteria matches the first filter criteria;
transmitting from the website to the system a command to record the first subset of recommended video programs as a result of the determining, the first subset of recommended video programs being identified by an information code included in the symbol that includes the first filter criteria; and
causing the video recorder to be automatically invoked to record the first subset of recommended video programs based on the first filter criteria.

22. The method of claim 21 wherein, based on the first filter criteria, none of the recommended video programs in the second subset of recommended video programs are recorded.

\* \* \* \* \*